(12) United States Patent
Tano et al.

(10) Patent No.: US 11,170,527 B2
(45) Date of Patent: Nov. 9, 2021

(54) ELECTRONIC DEVICE, CONTROL METHOD, AND RECORDING MEDIUM

(71) Applicant: KYOCERA Corporation, Kyoto (JP)

(72) Inventors: Masaki Tano, Tokyo (JP); Keisuke Okawa, Yokohama (JP); Ryota Nakazawa, Yokohama (JP); Naoyuki Tamai, Takarazuka (JP)

(73) Assignee: KYOCERA CORPORATION, Kyoto (JP)

( * ) Notice: Subject to any disclaimer, the term of this patent is extended or adjusted under 35 U.S.C. 154(b) by 146 days.

(21) Appl. No.: 16/283,817

(22) Filed: Feb. 25, 2019

(65) Prior Publication Data
US 2019/0266750 A1 Aug. 29, 2019

(30) Foreign Application Priority Data
Feb. 26, 2018 (JP) .............................. JP2018-032009

(51) Int. Cl.
*G06T 7/73* (2017.01)
*G06F 3/0488* (2013.01)
(Continued)

(52) U.S. Cl.
CPC .............. *G06T 7/74* (2017.01); *G06F 3/0482* (2013.01); *G06F 3/0488* (2013.01); *G06F 3/04815* (2013.01); *H04N 5/23212* (2013.01); *H04N 5/23216* (2013.01); *H04N 5/23218* (2018.08); *G06T 2207/20212* (2013.01); *G06T 2207/30221* (2013.01); *H04N 5/232933* (2018.08); *H04N 5/232935* (2018.08); *H04N 7/188* (2013.01)

(58) Field of Classification Search
CPC ............. G06T 7/74; G06T 2207/20212; G06T 2207/30221; G06F 3/0482; G06F 3/0488; G06F 3/04815; H04N 5/23218; H04N 5/23212; H04N 5/23216; H04N 7/188; H04N 5/232933; H04N 5/232935
See application file for complete search history.

(56) References Cited

U.S. PATENT DOCUMENTS

2004/0008268 A1 1/2004 Tsubota et al.
2013/0331146 A1* 12/2013 Wills ...................... A01K 97/00
455/556.1
(Continued)

FOREIGN PATENT DOCUMENTS

JP H5-297445 A 11/1993
JP H10-115861 A 5/1998
(Continued)

OTHER PUBLICATIONS

English Translation of Japanese Patent Document JP2005-142938 (Year: 2005).*

*Primary Examiner* — Jon Chang
(74) *Attorney, Agent, or Firm* — Hauptman Ham, LLP

(57) ABSTRACT

An electronic device includes a camera (imaging unit), a sensor, a display (display unit), and a controller. The controller measures, on the basis of a captured image captured by the camera, size information related to at least a portion of a particular subject included in the captured image and causes an overlay image to be displayed on the display. The overlay image is yielded by overlaying both the size information and sensor information based on a detection result of the sensor on the captured image.

19 Claims, 19 Drawing Sheets

(51) Int. Cl.
*G06F 3/0482* (2013.01)
*G06F 3/0481* (2013.01)
*H04N 5/232* (2006.01)
*H04N 7/18* (2006.01)

(56) References Cited

U.S. PATENT DOCUMENTS

| | | | |
|---|---|---|---|
| 2014/0307086 A1 | 10/2014 | Ota et al. | |
| 2017/0003879 A1 | 1/2017 | Tamai et al. | |
| 2017/0263029 A1* | 9/2017 | Yan | G06F 3/04845 |
| 2018/0107382 A1 | 4/2018 | Tamai et al. | |
| 2019/0246060 A1* | 8/2019 | Tanabe | G06F 3/0304 |

FOREIGN PATENT DOCUMENTS

| | | |
|---|---|---|
| JP | 2004-48577 A | 2/2004 |
| JP | 2005-142938 A | 6/2005 |
| JP | 2006-251347 A | 9/2006 |
| JP | 2011-193208 A | 9/2011 |
| JP | 2013-21733 A | 1/2013 |
| JP | 2016-122990 A | 7/2016 |
| WO | 2013/099271 A1 | 7/2013 |

\* cited by examiner

FIG. 7

| Use / Sensor information | Surfing/marine sports | Hiking | Skiing/snowboarding | Cycling | Fishing | Trekking | Walking |
|---|---|---|---|---|---|---|---|
| Speed information | ○ | ○ | ○ | ○ | | | |
| Distance information | ○ | ○ | ○ | ○ | | | |
| Height information | | ○ | ○ | ○ | | ○ | |
| Gravitational acceleration information | ○ | ○ | ○ | ○ | | ○ | |
| Barometric pressure information | | ○ | ○ | | ○ | ○ | |
| Travel path information | ○ | ○ | ○ | ○ | ○ | | ○ |
| Wind speed information | | ○ | ○ | ○ | ○ | ○ | |
| Direction information | ○ | ○ | ○ | | ○ | | |
| Temperature information | | ○ | | | ○ | ○ | ○ |
| Size information | | | | | ○ | | ○ |
| Name | | ○ | | | ○ | ○ | ○ |

ELECTRONIC DEVICE, CONTROL METHOD, AND RECORDING MEDIUM

CROSS-REFERENCE TO RELATED APPLICATION

The present application claims priority to and the benefit of Japanese Patent Application No. 2018-032009 filed Feb. 26, 2018, the entire contents of which are incorporated herein by reference.

TECHNICAL FIELD

The present disclosure relates to an electronic device, a control method, and a recording medium.

BACKGROUND

A known electronic device displays an image along with date information related to the image. For example, a device causes an image to be displayed along with date information on a display.

SUMMARY

Techniques for displaying images and information detected by various functional blocks in an electronic device have room for improvement.

It would therefore be helpful to provide an electronic device, a control method, and a recording medium that improve the convenience of information display.

An electronic device according to an aspect of the present disclosure includes a camera, a sensor, a display, and a controller. The controller measures, on the basis of a captured image captured by the camera, size information related to at least a portion of a particular subject included in the captured image. The controller causes an overlay image to be displayed on the display. The overlay image is yielded by overlaying both the size information and sensor information based on a detection result of the sensor on the captured image.

A method according to an aspect of the present disclosure is a method for controlling an electronic device including a camera, a sensor, a display, and a controller. The method includes measuring, using the controller, size information on the basis of a captured image captured by the camera. The size information is related to at least a portion of a particular subject included in the captured image. The method includes causing, using the controller, an overlay image to be displayed on the display. The overlay image is yielded by overlaying both the size information and sensor information based on a detection result of the sensor on the captured image.

A non-transitory computer-readable recording medium according to an aspect of the present disclosure includes computer program instructions to be executed by an electronic device including a camera, a sensor, a display, and a controller. The instructions cause the controller to measure size information on the basis of a captured image captured by the camera. The size information is related to at least a portion of a particular subject included in the captured image. The instructions cause the controller to cause an overlay image to be displayed on the display. The overlay image is yielded by overlaying both the size information and sensor information based on a detection result of the sensor on the captured image.

An electronic device according to an aspect of the present disclosure includes a camera, a communication interface, a display, and a controller. The controller measures, on the basis of a captured image captured by the camera, size information related to at least a portion of a particular subject included in the captured image. The controller causes an overlay image to be displayed on the display. The overlay image is yielded by overlaying both the size information and information acquired by the communication interface on the captured image.

An electronic device according to an aspect of the present disclosure includes a camera, a communication interface, a display, and a controller. The controller measures, on the basis of a captured image captured by the camera, size information related to at least a portion of a particular subject included in the captured image. The controller identifies a name of the particular subject on the basis of name information, acquired by the communication interface, of a tangible object. The controller causes an overlay image to be displayed on the display. The overlay image is yielded by overlaying both the size information and the name on the captured image.

The foregoing and other features and advantages of an electronic device, a control method, and a recording medium of the present disclosure will be more apparent from the detailed description with reference to the accompanying drawings.

BRIEF DESCRIPTION OF THE DRAWINGS

In the accompanying drawings:

FIG. 7 illustrates an example of the correspondence between exercise and sensor information that is overlaid;

DETAILED DESCRIPTION

Figure 1:
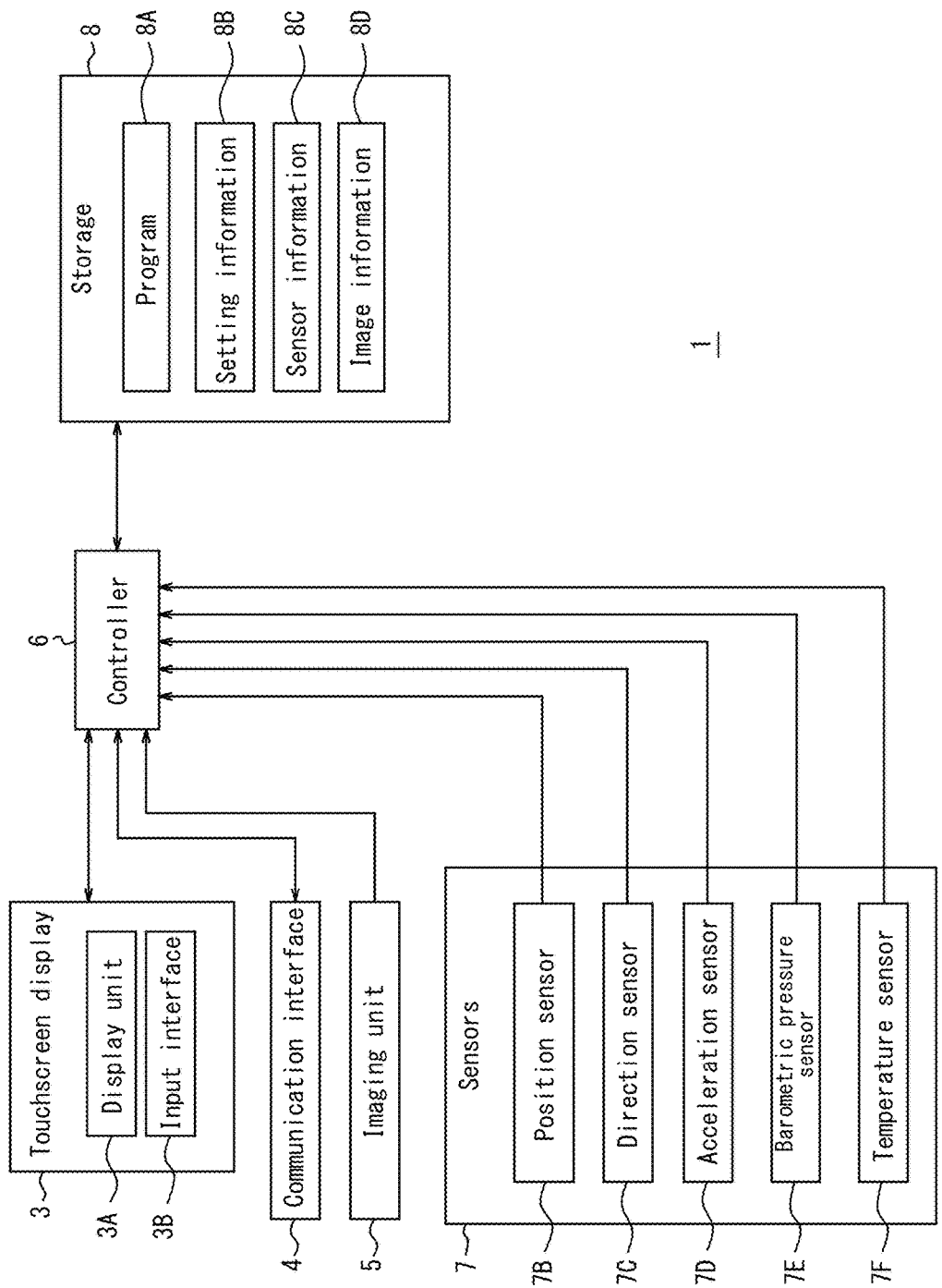
FIG. 1 is a functional block diagram illustrating the schematic configuration of an electronic device according to an embodiment.

FIG. 1 is a functional block diagram illustrating the schematic configuration of an electronic device 1 according to the present embodiment. As illustrated in FIG. 1, the electronic device 1 includes a touchscreen display 3, a communication interface 4, an imaging unit 5, a controller 6, sensors 7, and a storage 8. The components constituting these functional units are stored in or fixed to a housing 2, described below.

The touchscreen display 3 is an apparatus allowing data input by the touching of displayed images. The touchscreen display 3 includes a display unit 3A and an input interface 3B. The display unit 3A is provided with a display device such as a liquid crystal display, an organic Electro-Luminescence (EL) panel, or an inorganic EL panel. The display unit 3A displays information such as letters, images, symbols, and graphics. The information necessary for display on the display unit 3A is transmitted by the controller 6. The display unit 3A may include a backlight or the like as necessary.

The input interface 3B is a touch sensor that detects contact by a finger of the user operating the touchscreen display 3, a stylus, or the like. The input interface 3B can detect the position on the input interface 3B contacted by a finger, stylus, or the like. Any detection system may be used in the input interface 3B, such as a capacitive system, a resistive film system, a surface acoustic wave system (or an ultrasonic wave system), an infrared system, an electromagnetic induction system, a load detection system, or the like. The signal detected by the input interface 3B is output to the controller 6.

The communication interface 4 transmits and receives information over a communication network. The communication method that the communication interface 4 uses to transmit and receive information is prescribed by a wireless communication standard. Examples of wireless communication standards include 2nd Generation (2G), 3rd Generation (3G), and 4th Generation (4G). Other examples of wireless communication standards include Long Term Evolution (LTE), W-CDMA, CDMA2000, PDC, Global System for Mobile communications (GSM® (GSM is a registered trademark in Japan, other countries, or both)), and Personal Handy-phone System (PHS). Further examples of wireless communication standards include the Standard for Wireless Fidelity (WiFi), Worldwide Interoperability for Microwave Access (WiMAX), IEEE802.11, Bluetooth® (Bluetooth is a registered trademark in Japan, other countries, or both), Infrared Data Association (IrDA), and Near Field radio Communication (NFC). The communication interface 4 may support one or more of the aforementioned communication standards.

The communication interface 4 can acquire wind speed information indicating the wind speed at the position of the electronic device 1 from an external server or the like and output the wind speed information to the controller 6. The communication interface 4 may also acquire weather information, map information, mountain weather information, sea weather/wave information, snow information, sunrise/sunset information, tide information, or the like and output this information to the controller 6. The controller 6 may store this information in the storage 8 as sensor information 8C in order to handle this information in the same way as other information output by the sensors 7.

The communication interface 4 can acquire the database 11, described below, and output the database 11 to the controller 6 for storage in the storage 8. As described below, the controller 6 can acquire the name of a subject on the basis of the database 11 stored in the storage 8. The controller 6 may store the acquired name in the storage 8 as sensor information 8C in order to handle the name in the same way as other information output by the sensors 7. The name is used during overlay processing, as described below.

The imaging unit 5 is a camera for capturing images. The imaging unit 5 includes at least an optical system and an image sensor. The image sensor captures an image by conversion into an image signal of an image of a subject formed via the optical system on an optical detection surface. A Charge-Coupled Device (CCD) image sensor, a Complementary Metal Oxide Semiconductor (CMOS) image sensor, or the like is used as the image sensor. The image captured by the imaging unit 5 is output to the controller 6. As described below, the controller 6 can acquire size information on the basis of the captured image. The controller 6 may store the acquired size information in the storage 8 as sensor information 8C in order to handle the size information in the same way as other information output by the sensors 7. The size information is used during overlay processing, as described below.

The sensors 7 detect information of a detection target. The sensors 7 can detect changes in the detection target by continuously detecting the detection target. The sensors 7 output the detected values to the controller 6. At least a portion of the detected values may be sensor information 8C, described below. In other words, at least a portion of the sensors 7 output information of the detection target to the controller 6 as sensor information 8C.

The sensors 7 include a position sensor 7B, a direction sensor 7C, an acceleration sensor 7D, a barometric pressure sensor 7E, and a temperature sensor 7F. A portion of these sensors may be omitted from the sensors 7. For example, the sensors 7 need not include the temperature sensor 7F. The sensors 7 may also include a different sensor.

The position sensor 7B acquires position information indicating the position of the electronic device 1. For example, the position sensor 7B receives a GPS signal from a GPS satellite indicating the position of the GPS satellite, the transmission time of the signal, and the like. The position sensor 7B then acquires position information indicating the position of the electronic device 1 on the basis of the GPS signal. The position sensor 7B acquires the position information continuously to acquire travel path information on the basis of a history of positions indicated by the position information. The position sensor 7B calculates the change in position per unit time as the speed of the electronic device 1 to acquire speed information indicating the calculated speed. The position sensor 7B acquires distance information indicating the travel distance of the electronic device 1 calculated on the basis of the change in position. The position sensor 7B outputs the acquired position information, travel path information, speed information, and distance information to the controller 6 as sensor information 8C.

The direction sensor 7C is, for example, a magnetic sensor or a gyro sensor. The direction sensor 7C acquires direction information indicating the direction on the basis of a change in geomagnetism. The direction sensor 7C outputs the acquired direction information to the controller 6.

The acceleration sensor 7D acquires gravitational acceleration information indicating the acceleration of the electronic device 1 in the direction of gravity. The acceleration sensor 7D outputs the gravitational acceleration information to the controller 6 as sensor information 8C.

The barometric pressure sensor 7E acquires barometric pressure information indicating the barometric pressure of the surrounding environment of the electronic device 1. The barometric pressure sensor 7E outputs the barometric pressure information to the controller 6 as sensor information 8C.

The temperature sensor 7F acquires temperature information indicating the temperature of the surrounding environment of the electronic device 1. The temperature sensor 7F also outputs the temperature information to the controller 6 as sensor information 8C.

The storage 8 stores a program 8A, setting information 8B, sensor information 8C, and image information 8D. The storage 8 may also be used as a working area to store results of processing by the controller 6 temporarily. The storage 8 may include any appropriate storage device, such as a semiconductor storage device or a magnetic storage device. The storage 8 may also include a plurality of types of storage devices. The storage 8 may include a combination of a portable storage medium, such as a memory card, and an apparatus for reading the storage medium.

The program 8A is a program for controlling the electronic device 1. The electronic device 1 executes various functions by the controller 6 following the instructions of the program 8A. The program 8A may be installed on the storage 8 through wireless communication via the communication interface 4 or from a storage medium. The program 8A includes an overlay application for the controller 6 to execute overlay processing. Here, overlay processing includes processing to generate an overlay image by overlaying the sensor information 8C on an image captured by the imaging unit 5. The overlay processing also includes processing to store the overlay image in the storage 8 as the image information 8D on the basis of the setting information 8B. In the present disclosure, an "application" is short for an application program.

The setting information 8B is information on settings related to overlay processing designated by the user. The setting information 8B includes the table described below, for example.

The sensor information 8C is information acquired by the controller 6 from the sensors 7 and information generated on the basis of information acquired by the controller 6 from the sensors 7. The sensor information 8C includes information that can change over time in accordance with changes in the state (for example, the surrounding environment) of the electronic device 1. The sensor information 8C is, for example, position information, travel path information, speed information, distance information, direction information, gravitational acceleration information, barometric pressure information, height information, temperature information, size information, names, and the like. The sensor information 8C is not limited to the above types of information and may, for example, further include at least one of wind speed information, weather information, map information, mountain weather information, sea weather/wave information, snow information, sunrise/sunset information, tide information, and the like.

The image information 8D is information of images on which overlay processing has been performed. The image information 8D includes still images and moving images. The controller 6 can, for example, read the image information 8D from the storage 8 (such as a video on which overlay processing has been performed) and cause the image information 8D to be displayed on the touchscreen display 3.

The controller 6 may, for example, be a Central Processing Unit (CPU). The controller 6 may be a System-on-a-Chip (SoC) or other type of integrated circuit in which other components, such as the communication interface 4, are integrated. The controller 6 may be configured by combining a plurality of integrated circuits. The controller 6 controls the functional units of the electronic device 1 and implements a variety of functions by comprehensively controlling operations of the electronic device 1. Details of the operations of the controller 6 in the present embodiment are provided below.

The electronic device 1 of the present embodiment generates an image (overlay image) by overlaying sensor information 8C on a captured image and displays the overlay image on a display as a preview image. The electronic device 1 of the present embodiment can store the overlay image displayed on the display unit 3A in the storage 8. The electronic device 1 of the present embodiment overlays the sensor information 8C on the captured image when the image is captured. Furthermore, the electronic device 1 of the present embodiment stores the image with the sensor information 8C overlaid thereon. Consequently, the electronic device 1 of the present embodiment allows the user to reliably store captured images in real time after visually confirming that the sensor information 8C is overlaid on the captured image in a desired form (position, size, and the like).

Figure 2:
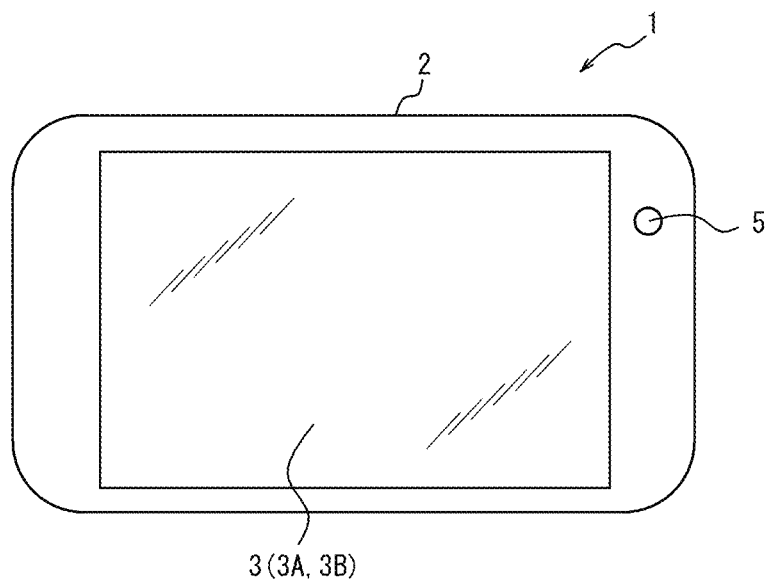
FIG. 2 is an external view of the electronic device in FIG. 1.

FIG. 2 is an external view of the electronic device 1. The electronic device 1 may, for example, be a smartphone but is not limited to being a smartphone. The electronic device 1 may, for example, be a feature phone, a tablet, or the like. The electronic device 1 may also be an imaging apparatus equipped with sensors, such as a digital camera or an action camera.

FIG. 2 illustrates the front of the electronic device 1, where the touchscreen display 3 is located. The housing 2 forms the outside of the electronic device 1 and protects the components of the electronic device 1, such as the touchscreen display 3, that are stored in or fixed to the housing 2. As illustrated in FIG. 2, a portion of the imaging unit 5 (for example, a front camera) is provided on the front of the electronic device 1. The imaging unit 5 need not be provided on the front of the electronic device 1.

Figure 3:
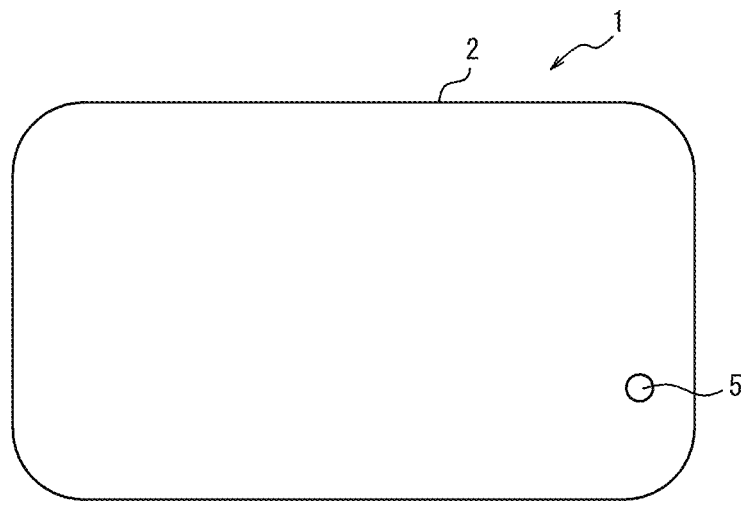
FIG. 3 is an external view of the electronic device in FIG. 1 from a different direction.

FIG. 3 illustrates the back of the electronic device 1, which is the opposite side from the front. As illustrated in FIG. 3, a portion of the imaging unit 5 (for example, a back camera) is provided on the back of the electronic device 1.

Figure 4:
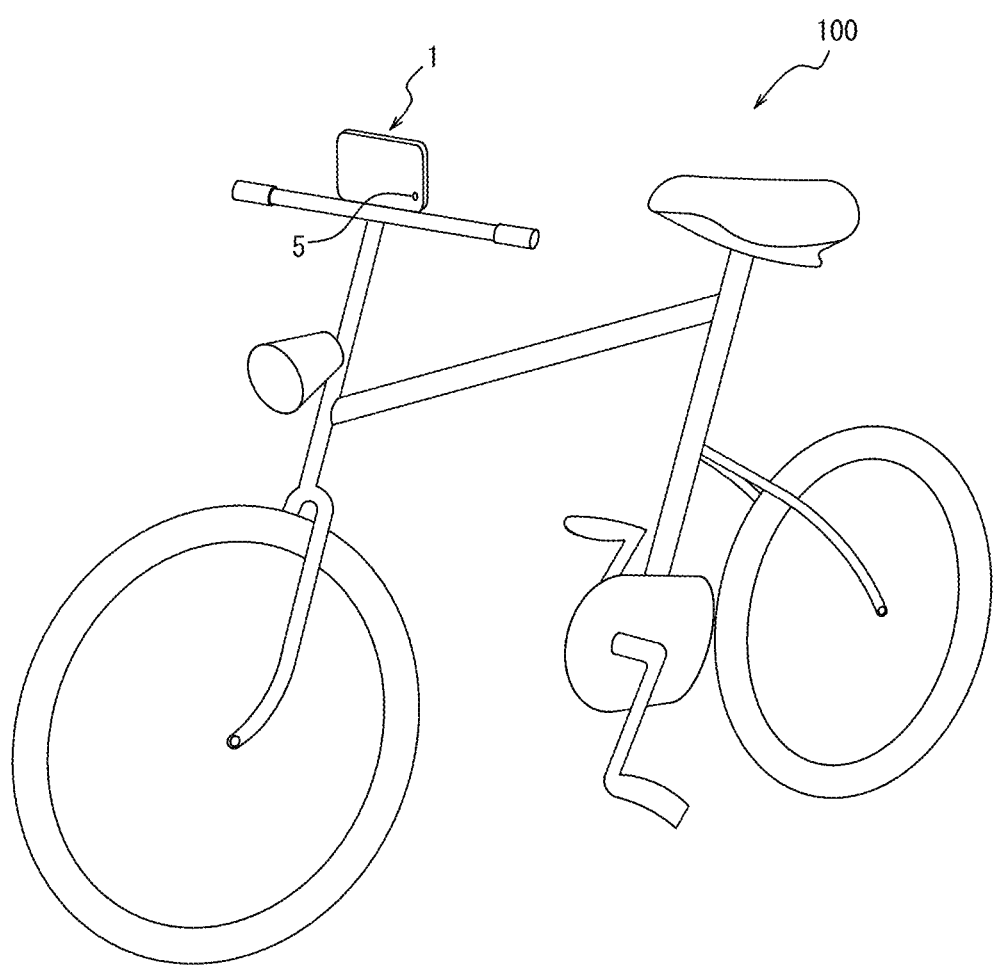
FIG. 4 illustrates an example of mounting the electronic device in FIG. 1 on a bicycle.

The electronic device 1 may, for example, be used while attached to the handlebars of a bicycle 100, as illustrated in FIG. 4. In this case, the electronic device 1 is attached with the imaging unit 5 facing any direction desired by the user, for example to capture images in the travel direction of the bicycle 100. The electronic device 1 is attached so as to allow the user to visually confirm the touchscreen display 3. Therefore, the user can, in real time, confirm images captured by the imaging unit 5 while the user is riding the bicycle 100.

Figure 5:
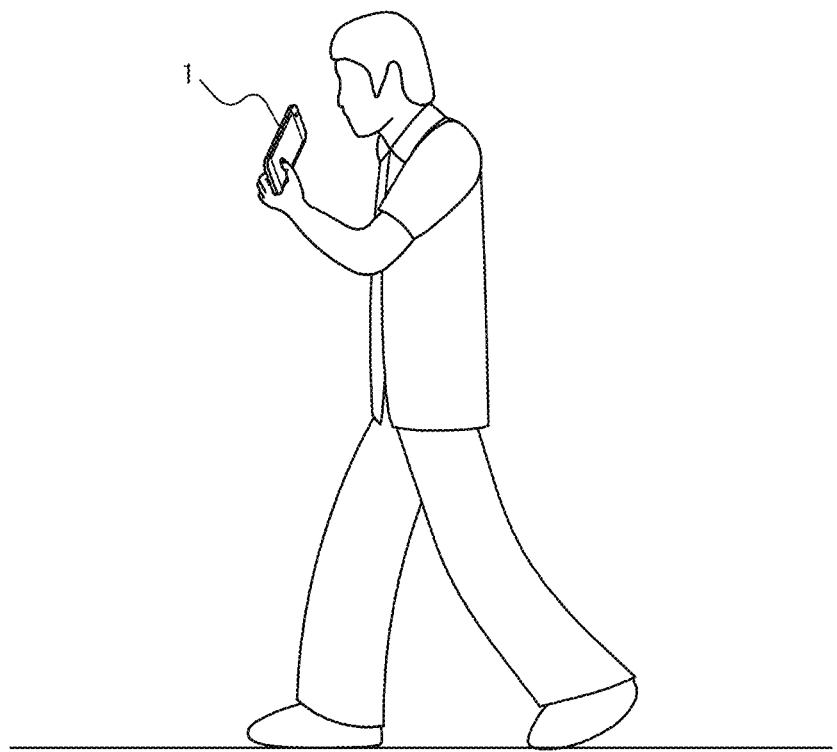
FIG. 5 illustrates an example of a user using the electronic device in FIG. 1 while walking.

The electronic device 1 may be held and used by the user while exercising. For example, the user can use the electronic device 1 while walking by holding the electronic device 1, as illustrated in FIG. 5. The user can also use the electronic device 1 by holding an auxiliary apparatus to which the electronic device 1 is attached. The electronic device 1 is held so that the imaging unit 5 captures images in a direction desired by the user. The user can, for example, visually confirm the touchscreen display 3 of the electronic device 1 while holding the electronic device 1 so that the imaging unit 5 captures images in the user's travel direction, as illustrated in FIG. 5. This allows the user to visually confirm, in real time, images captured by the imaging unit 5 while the user is exercising.

As described above, the controller 6 performs overlay processing with the overlay application. An overlay image yielded by overlaying the sensor information 8C on the image captured by the imaging unit 5 is displayed on the display unit 3A by the overlay processing. The overlay image is also stored in the storage 8 by the overlay processing. The sensor information 8C overlaid on the captured image can be selected by the user using the settings screen, described below.

Figure 6:
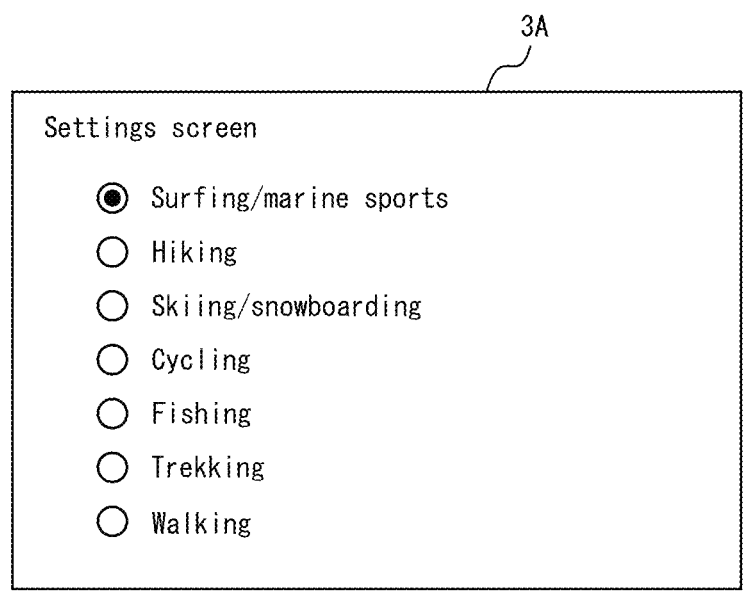
FIG. 6 illustrates an example of a settings screen.

FIG. 6 illustrates an example of a settings screen. Before the controller 6 starts the overlay processing, the user selects the sensor information 8C to be overlaid on the captured image using the settings screen in FIG. 6. The settings screen in FIG. 6 can, for example, be displayed by selection from a menu on an initial screen (top screen) of the electronic device 1.

The settings screen in FIG. 6 is for selecting the situation where the electronic device 1 is to be used. Specifically, the settings screen is for selecting what type of exercise the user will be doing when using the electronic device 1. The types of exercise selectable on the settings screen in FIG. 6 are "surfing/marine sports", "hiking", "skiing/snowboarding", "cycling", "fishing", "trekking", and "walking". The user selects one type of exercise by touching a radio button. The selected type of exercise is stored in the storage 8 as one piece of setting information 8B.

FIG. 7 illustrates an example of the correspondence between exercise (use) and the sensor information 8C that is overlaid on the captured image. In the table in FIG. 7, circles indicate correspondence between types of exercise and pieces of sensor information 8C. The table in FIG. 7 is stored in the storage 8 as one piece of setting information 8B.

The controller 6 reads the type of exercise selected by the user from the setting information 8B. The controller 6 then reads the table in FIG. 7 from the setting information 8B and determines the sensor information 8C corresponding to the selected type of exercise. For example, when the type of exercise selected by the user is surfing/marine sports, the controller 6 determines that the sensor information 8C to be overlaid on a captured image is speed information, distance information, gravitational acceleration information, wind speed information, and temperature information. In other words, the controller 6 displays an overlay image yielded by overlaying the speed information, distance information, gravitational acceleration information, wind speed information, and temperature information on a captured image. When instructed by the user, the controller 6 stores the overlay image.

On the basis of the table associating exercise and sensor information 8C to be overlaid on a captured image, the sensor information 8C is automatically determined in accordance with the type of exercise selected by the user. Therefore, the user can easily determine the sensor information 8C by simply selecting the situation in which the electronic device 1 is to be used (in the present embodiment, the exercise the user is going to perform).

Here, the settings screen may use checkboxes instead of radio buttons. In this case, the user can select one or more types of exercise. The controller 6 then overlays all of the sensor information 8C corresponding to the one or more selected types of exercise on a captured image.

The sensor information 8C to be overlaid on the captured image need not be restricted to the items of the sensor information 8C in the aforementioned table (speed information, distance information, height information, gravitational acceleration information, barometric pressure information, travel path information, wind speed information, direction information, temperature information, size information, and names). The controller 6 may further overlay current time information on the captured image regardless of the type of exercise selected by the user. The controller 6 may further overlay position information on the captured image regardless of the type of exercise selected by the user. The controller 6 may further overlay elapsed time information on the captured image regardless of the type of exercise selected by the user. This information indicates the time elapsed from the start of storage of an overlay image that is a moving image.

Figure 8:
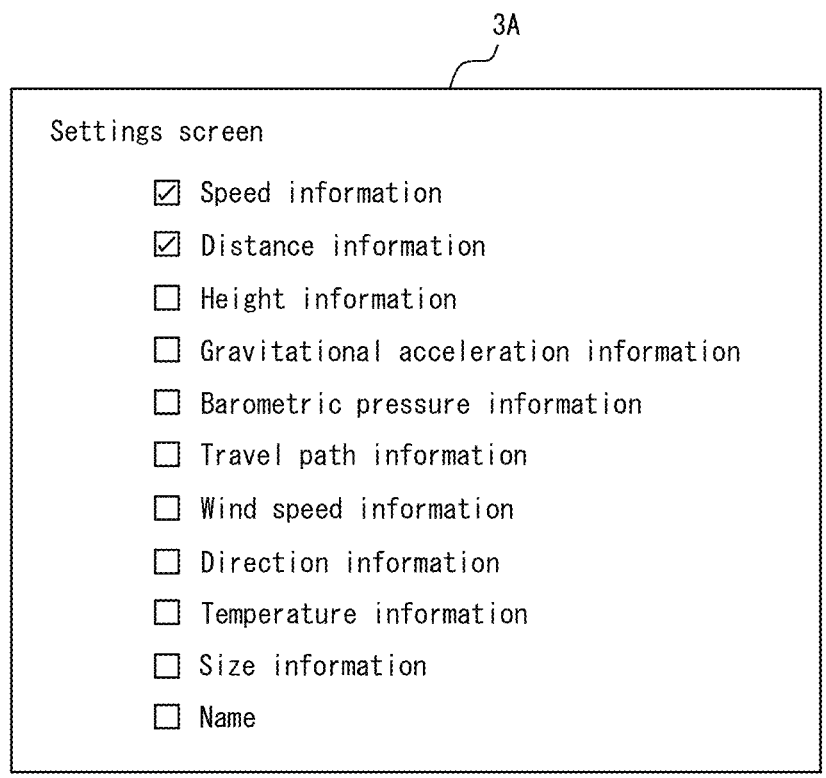
FIG. 8 illustrates an example of another settings screen.

FIG. 8 illustrates an example of another settings screen. In this example, the settings screen allows the user to individually select the sensor information 8C. As illustrated in FIG. 8, each type of sensor information 8C is displayed along with a checkbox on the settings screen. The user selects one or more types of sensor information 8C to overlay on the captured image by touching the checkboxes. The selected types of sensor information 8C are stored in the storage 8 as one piece of setting information 8B. The controller 6 reads the sensor information 8C selected by the user from the setting information 8B. The controller 6 displays an overlay image on which the selected sensor information 8C is overlaid. When instructed by the user, the controller 6 stores the overlay image.

When the settings screen in FIG. 8 is used, the user can individually set the sensor information 8C to be overlaid on the captured image. Users can therefore customize the overlay image to suit their preferences.

As yet another example, the settings screen in FIG. 6 (first settings screen) and the settings screen in FIG. 8 (second settings screen) may be used together. The user can cause the first settings screen and the second settings screen to be displayed in order using a menu on the initial screen of the electronic device 1, for example. The user first selects a type of exercise on the first settings screen. The selected type of exercise is stored in the storage 8 as one piece of setting information 8B. The controller 6 reads the type of exercise selected by the user from the setting information 8B. The controller 6 then reads the table in FIG. 7 from the setting information 8B and determines the sensor information 8C corresponding to the selected type of exercise. The controller 6 sets the checkboxes of the second settings screen to a default selection of the sensor information 8C corresponding to the selected type of exercise. In other words, the controller 6 stores initial values of the checkboxes of the second settings screen based on the selected type of exercise as one piece of setting information 8B. The user then selects or deselects sensor information 8C by touching the checkboxes on the second settings screen. The user can therefore adjust the sensor information 8C on the second settings screen.

For example, the user may select surfing/marine sports on the first settings screen. The controller 6 reads the table illustrated in FIG. 7 and sets the speed information, distance information, gravitational acceleration information, wind speed information, and temperature information to be initially selected (by default) on the second settings screen. The controller 6 then displays the second settings screen in response to user operation. At this time, the checkboxes for the speed information, distance information, gravitational acceleration information, wind speed information, and temperature information are selected on the second settings screen. The user can select additional sensor information 8C or deselect sensor information 8C on the second settings screen. For example, if the user deselects the gravitational acceleration information, wind speed information, and temperature information, then only the speed information and distance information remain selected. In this way, the user can use the second settings screen to adjust the sensor information 8C corresponding to the type of exercise selected on the first settings screen. The user can therefore easily customize the sensor information 8C to be overlaid on the captured image.

After the sensor information 8C to be overlaid on the captured image is set, the controller 6 executes the overlay processing when the user performs a predetermined operation to initiate the overlay processing. An example of the predetermined operation is the touching of a predetermined object displayed on the touchscreen display 3.

When instructed to initiate the overlay processing, the controller 6 acquires the sensor information 8C to be overlaid on a captured image from the storage 8. The controller 6 then generates an overlay image by overlaying the sensor information 8C on the captured image. The controller 6 displays the generated overlay image on the display unit 3A.

Figure 9:
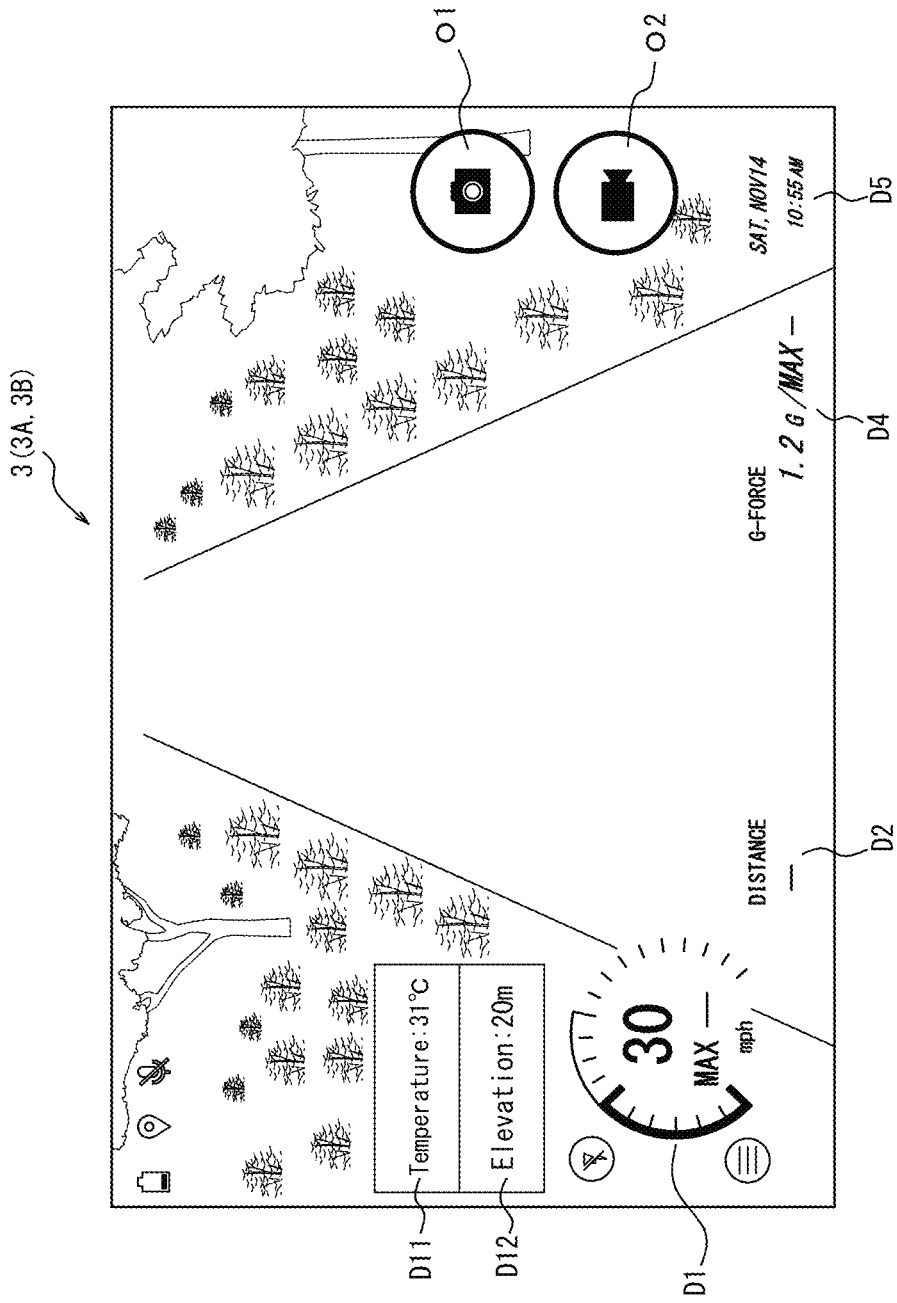
FIG. 9 illustrates an example of an overlay image displayed on a display unit.

FIG. 9 illustrates an example of an overlay image displayed on the display unit 3A. In the example in FIG. 9, the user is riding the bicycle 100. The electronic device 1 is used while attached to the handlebars of the bicycle 100.

The controller 6 displays an overlay image yielded by overlaying various information (speed information D1, distance information D2, gravitational acceleration information D4, current time information D5, temperature information D11, and height information D12) on a captured image. As illustrated in FIG. 9, the various information overlaid on the captured image may be sensor information 8C that includes numerical information. The various information overlaid on the captured image may be sensor information 8C that includes text information. The text information indicates the specific content of the numerical information.

For example, the gravitational acceleration information D4 illustrated in FIG. 9 is one type of sensor information 8C. The gravitational acceleration information D4 includes the numerical information "1.2 (G)". The gravitational acceleration information D4 also includes the text information "G-FORCE". The numerical information "1.2 (G)" in the gravitational acceleration information D4 changes over time. The text information "G-FORCE" indicates that "1.2 (G)" is the value of acceleration in the direction of gravity. The temperature information D11 illustrated in FIG. 9, for example, is also one type of sensor information 8C. The temperature information D11 includes the numerical information "31° C.". The temperature information D11 includes the text information "temperature". The text information "temperature" indicates that "31° C." is the temperature.

The controller 6 may arrange the information (speed information D1, distance information D2, gravitational acceleration information D4, current time information D5, temperature information D11, and height information D12) at appropriate positions to avoid disturbing the user's exercise. In the example in FIG. 9, the user is riding the bicycle 100. Information is therefore preferably not overlaid on the central and upper central portions of the display unit 3A, where the road in the direction of travel is displayed. Rather, information is preferably displayed at the lower portion or near the sides of the captured image, as illustrated in FIG. 9.

Objects for user operation are also displayed in the overlay image. The controller 6 causes a still image storage object O1, for example, to be displayed on the touchscreen display 3. The overlay image is stored as a still image when the user touches the still image storage object O1. The controller 6 also causes a moving image storage object O2, for example, to be displayed on the touchscreen display 3. The overlay image is stored as a moving image when the user touches the moving image storage object O2. The controller 6 causes an end object O3, for example, to be displayed on the touchscreen display 3 when storage of the moving image begins. Storage of the moving image ends when the user touches the end object O3. The end object O3 may be displayed instead of the still image storage object O1 and the moving image storage object O2.

The controller 6 can display (reproduce) an overlay image stored in the storage 8 as image information 8D on the touchscreen display 3. Unlike the information overlaid on the captured image (such as the speed information D1), however, the objects for user operation are not stored in the storage 8. In other words, information such as the speed information D1 and the distance information D2, for example, is displayed during reproduction. Objects, on the other hand, are not displayed during reproduction. The overlay images stored in the storage 8 as image information 8D may be acquired from an external device. In other words, the controller 6 may display (reproduce) an overlay image acquired from an external device through the communication interface 4 on the touchscreen display 3.

Figure 10:
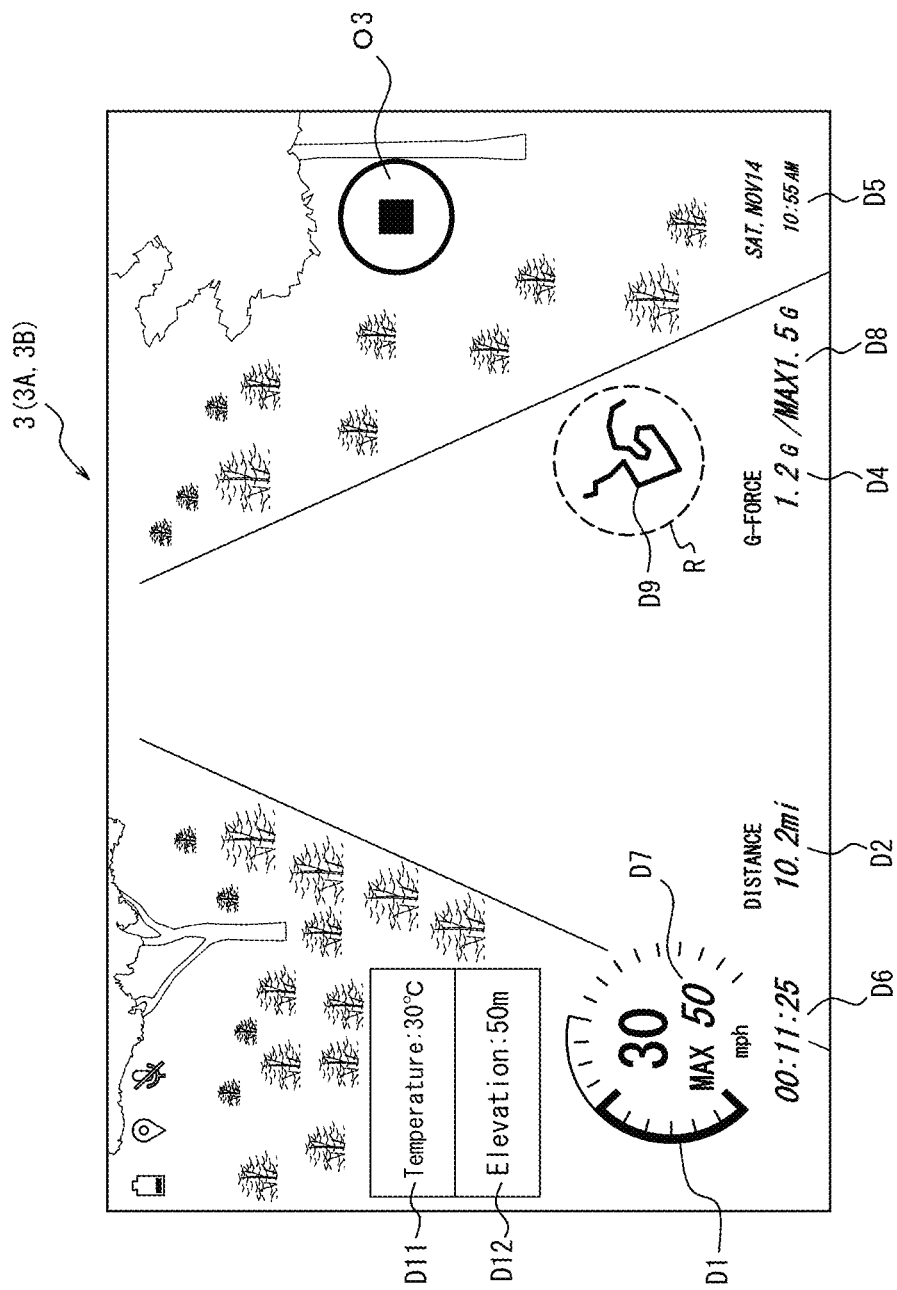
FIG. 10 illustrates another example of an overlay image displayed on the display unit.

FIG. 10 illustrates another example of an overlay image displayed on the display unit 3A. FIG. 10 illustrates an overlay image displayed after time has elapsed from the state in FIG. 9. As illustrated in FIG. 10, the information overlaid on the captured image may change (in this example, increase) over time. The controller 6 may overlay elapsed time information D6, indicating the time elapsed from the start of storage of the overlay image (moving image), on the captured image. The controller 6 may also overlay maximum speed information D7, indicating the maximum speed attained from the start of storage of the overlay image, on the captured image. The controller 6 may also overlay maximum gravitational acceleration information D8, indicating the maximum acceleration in the direction of gravity attained from the start of storage of the overlay image, on the captured image. The controller 6 may also overlay travel path information D9 on the captured image. The travel path information D9 includes an object showing a history, based on position information, of positions in actual space (the travel path). The object is reduced to be displayable in a predetermined region R.

Figure 11:
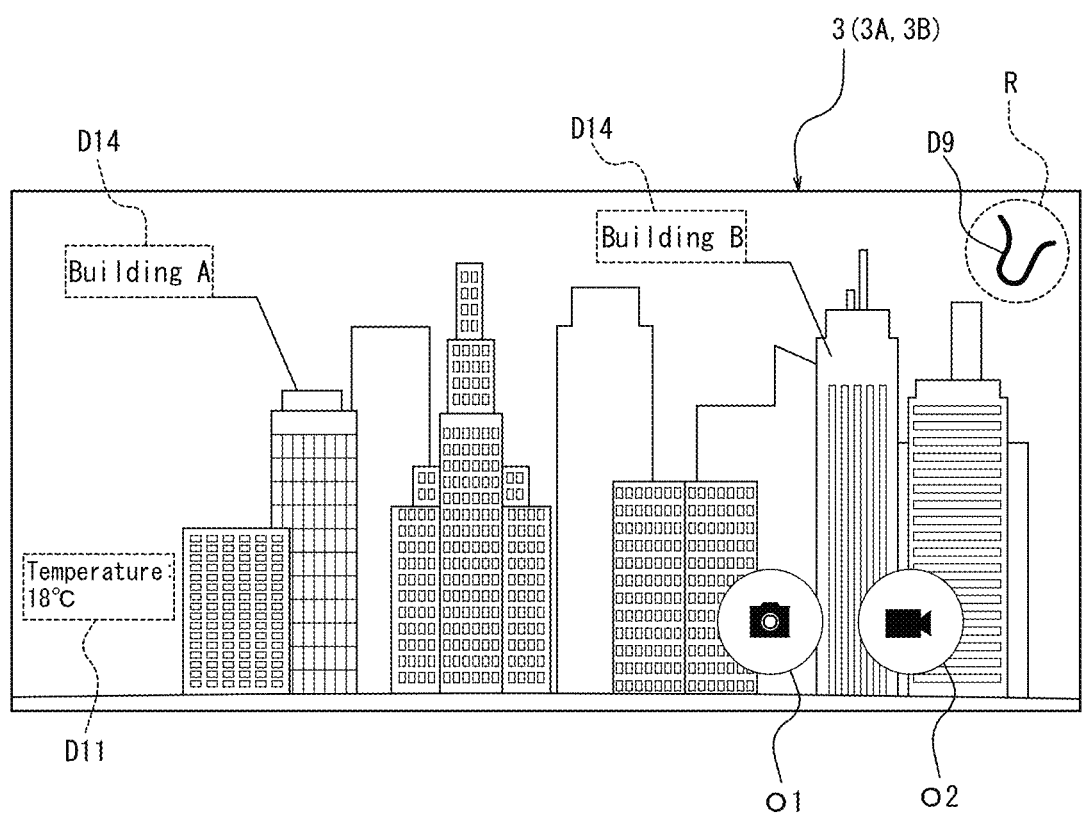
FIG. 11 illustrates yet another example of an overlay image displayed on the display unit.

FIG. 11 illustrates another example of an overlay image displayed on the display unit 3A. In the example in FIG. 11, the user is walking. FIG. 11 illustrates an overlay image yielded by overlaying information on an image of the surroundings captured by the imaging unit 5 while the user is walking. The overlay image in FIG. 11 includes travel path information D9 displayed in a predetermined region R, temperature information D11, and names D14. As described above, the travel path information D9 indicates the travel path of the user in actual space as a reduced object. The temperature information D11 indicates the temperature of the surrounding environment of the electronic device 1 measured by the temperature sensor 7F. The names D14 indicate the names of particular subjects included in the captured image. In the example in FIG. 11, the names D14 are building A and building B. As described above, objects for user operation such as the still image storage object O1 and the moving image storage object O2 are displayed on the overlay image.

Among the many buildings included in the captured image in FIG. 11, the particular subjects indicated by the names D14 are building A and building B. The particular subjects are, for example, determined as follows.

Figure 13:
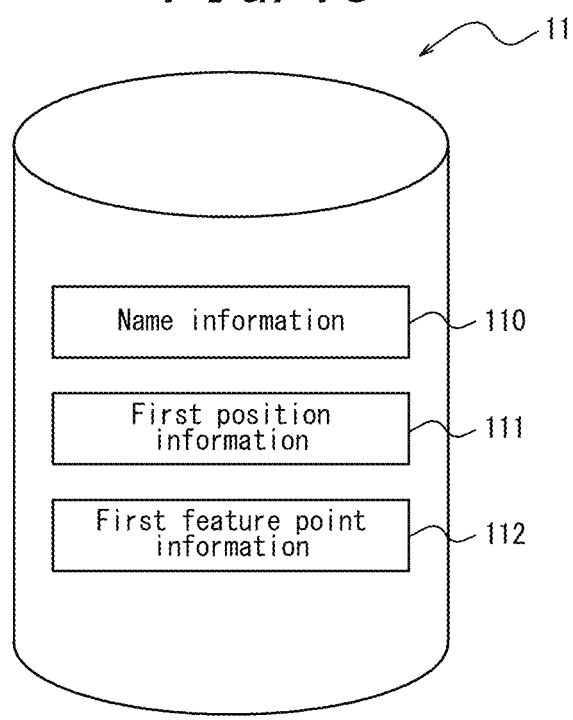
FIG. 13 illustrates an example configuration of a database.

The communication interface 4 acquires the database 11 from an external source in response to an instruction by the controller 6. The external source is, for example, an external server connected to the electronic device 1 over a network, such as the Internet. As illustrated in FIG. 13, the database 11 includes name information 110 of tangible objects, first position information 111, which is position information indicating the position of tangible objects, and first feature point information 112, which is information related to feature points of tangible objects. A tangible object is an object that physically occupies a portion of space. Tangible objects include man-made objects, such as buildings. Tangible objects also include natural objects, such as fish and mountains. The tangible objects in the database 11 are associated with particular subjects. The particular subjects therefore include man-made objects. The particular subjects also include natural objects. In another example, the database 11 may be stored in advance in the storage 8 instead of being acquired from an external source through the communication interface 4.

The name information 110 includes names of a plurality of tangible objects. When the tangible objects include buildings, for example, the name information 110 can include individual names, such as building A and building B. When the tangible objects are fish, for example, the name information 110 can include types such as yellowtail and mackerel pike. When the tangible objects are mountains, for example, the name information 110 can include individual names such as Mt. X and Mt. Y. The name information 110 may be limited to including only the names of locally well-known buildings, commonly caught types of fish, and well-known mountains.

The first position information 111 includes information on the positions of a plurality of tangible objects included in the name information 110. For example, when the tangible objects include buildings, the first position information 111 can include individual positions (coordinates), such as the coordinates of building A and the coordinates of building B. When the tangible objects include fish, for example, the first position information 111 can include the distributions (coordinate ranges) of the habitat of yellowtail, which is an ocean area at a water depth of approximately 100 m; the habitat of mackerel pike, which is an area of the North Pacific; and the like. When the tangible objects are mountains, for example, the first position information 111 can include individual positions (coordinates) such as the coordinates of Mt. X and the coordinates of Mt. Y.

The first feature point information 112 includes information related to the feature points of a plurality of tangible objects included in the name information 110. The first feature point information 112 includes, for example, the appearance in various types of weather, the appearance depending on the season or time (such as morning, afternoon, and night), and the appearance (shape) from various angles (directions). In the present embodiment, the first feature point information 112 includes images indicating these feature points for each of the tangible objects included in the name information 110.

On the basis of an image captured by the imaging unit 5, the controller 6 acquires distance information indicating the distance from the electronic device 1 to a particular subject included in the captured image. In the example in FIG. 11, a captured image (preview image) including numerous buildings is displayed on the touchscreen display 3. The user designates building A as a particular subject by touching building A. As another example, the controller 6 may judge that building A is a particular subject by using an autofocus function when the user changes the orientation of the electronic device 1 so that building A is included in the central portion of the screen. In other words, the user can set the particular subject without touching the touchscreen display 3. The controller 6 acquires distance information indicating the distance to the particular subject by using a well-known focus adjustment function provided in the imaging unit 5. This function may, for example, use an infrared laser. For example, the imaging unit 5 emits an infrared laser beam and uses a light-receiving element to receive the infrared laser beam reflected by the particular subject. The controller 6 can then acquire information such as the time until the imaging unit 5 receives the reflected infrared laser beam to calculate the distance information. The controller 6 can also acquire distance information calculated by the imaging unit 5.

Figure 12:
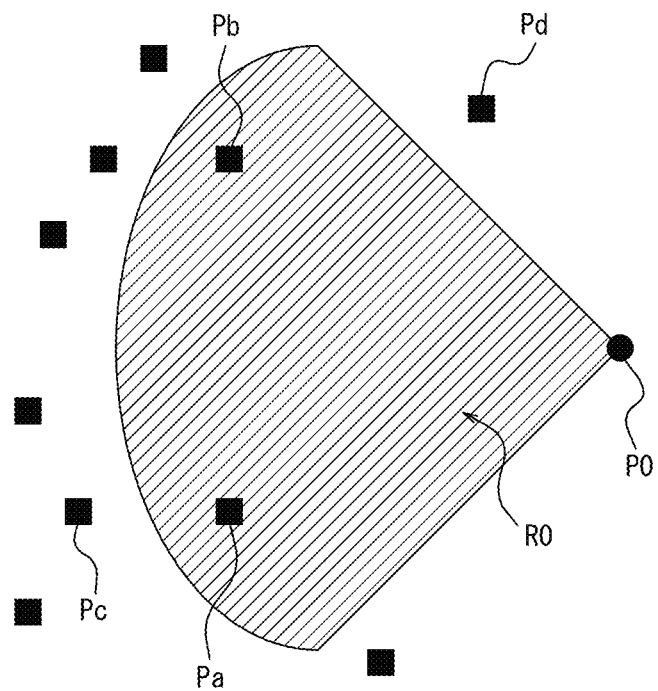
FIG. 12 illustrates an example of tangible objects included in a predetermined range.

FIG. 12 is a top view illustrating an overview of the relationship of a position Pa of building A and a position Pb of building B in the example in FIG. 11 to a position P0 of the electronic device 1. The controller 6 acquires position information of the electronic device 1 from the position sensor 7B as second position information. The second position information is, for example, the coordinates at position P0 of the electronic device 1. The controller 6 identifies tangible objects included in a first range R0 by identifying the first position information 111 that is included in the first range R0. The first range R0 extends the distance indicated by the distance information from the position P0 indicated by the second position information. Here, the distance indicated by the distance information from the position P0 indicated by the second position information corresponds to the straight line distance from the position Pa of building A in the example in FIG. 11 to the position P0 of the electronic device 1. The first range R0 is a fan-shaped portion extracted, at the angle of view of the captured image, from a circle whose center is position P0 and whose radius is the straight line distance from position Pa to position P0. The controller 6 may use information on the direction indicated by the direction sensor 7C. The shooting direction and the direction indicated by the direction sensor have a high probability of substantially matching. In other words, the controller may calculate the first range R0, defined by at the angle of view of the captured image, using information on the direction indicated by the direction sensor (which substantially matches the shooting direction) and information on the angle of view of the captured image. The controller 6 may set the first range R0 regardless of the angle of view of the captured image. For example, the controller 6 may set the first range R0 to a range with a predetermined angle width (such as 15° in each direction) to the left and right of a vector corresponding to the direction indicated by the direction sensor. The controller 6 identifies positions included in the first range R0 among the first position information 111 of the database 11. In the example in FIG. 12, position Pb of building B is included in the first range R0 as well as position Pa. Position Pc of a building farther from position P0 of the electronic device 1 and position Pd of a building not included within the angle of view of the captured image, however, are not included in the first range R0. The controller 6 judges that position Pa and position Pb are included in the first range R0 and identifies the corresponding tangible objects (building A and building B) from the name information 110. In other words, building A and building B are particular subjects in the example in FIG. 11.

On the basis of the image captured by the imaging unit 5, the controller 6 then generates image recognition information including second feature point information related to feature points of particular subjects. The controller 6 extracts the feature points of the particular subjects in the captured image, acquires the necessary sensor information 8C, and generates the second feature point information. The second feature point information is generated to be comparable to the first feature point information 112. For example, the second feature point information is information that allows identification of the appearance during the weather, season, or time of shooting and the appearance (shape) in the shooting direction detected by the direction sensor 7C. The controller 6 may, for example, extract the outlines of particular subjects in the captured image (in the example in FIG. 11, buildings A and B). The controller 6 then generates the second feature point information by combining the extracted outlines with weather information at the time of shooting, the orientation of the captured image, or the like.

The controller 6 may use the second feature point information as is as the image recognition information. The controller 6 may also generate the image recognition information by adding additional information to the second feature point information, as in the present embodiment. For example, the additional information included in the image recognition information may be ratio information indicating the ratio of a particular tangible object to all of the captured image. The ratio information can, for example, change the content of the overlay display. To increase viewability, the controller 6 may, for example, be configured not to overlay the name of a particular subject on the captured image when the particular subject has ratio information below a predetermined threshold (such as 5%). The additional information included the image recognition information may be three-dimensional (3D) map information of the range included in the captured image. The 3D map information clarifies the position, height, and relationships in the depth direction of not only the particular subjects but also fixed objects (such as buildings) and vehicles (such as cars) included in the captured image. The 3D map information can, for example, change the content of the overlay display. On the basis of the 3D map information, the controller 6 can judge whether the position of a particular subject in the overlay image has moved, and if so, the controller 6 can change the position of the name overlaid on the captured image. For example, when the particular subject in the overlay image is a vehicle, and the position of the vehicle is judged to be moving, the controller 6 may move the display position of the name in the overlay image without changing the display position relative to the particular subject (vehicle). In other words, the controller 6 can generate the overlay image on the basis of the 3D map information so that the display of a name follows a particular subject.

The controller 6 identifies the name of a particular subject in a captured image on the basis of the image recognition information, the database 11, and the second position information, which is position information of the electronic device 1 acquired by the position sensor 7B. The controller 6 then causes an overlay image, yielded by overlaying the name on the captured image, to be displayed on the touchscreen display 3. The controller 6 uses the second position information to identify the first range R0, as described above. Details of how the controller 6 uses the image recognition information and the database 11 are provided below.

The controller 6 acquires the first feature point information 112 of tangible objects included in the first range R0 from the first feature point information 112 of the database 11. The controller 6 then identifies a tangible object indicating a particular subject by identifying which of the acquired pieces of first feature point information 112 matches the second feature point information included in the image recognition information. The first feature point information 112, acquired by the controller 6, of tangible objects included in the first range R0 can include not only the first feature point information 112 of the buildings A and B but also the first feature point information 112 of other buildings. The controller 6 identifies a particular subject through a comparison with the second feature point information. A shape comparison at a certain angle (shooting direction) is used for a comparison with the second feature point information in the present embodiment, but this example is not limiting. The controller 6 can use a well-known method to judge matching based on a shape comparison.

The controller 6 designates a matching shape as a tangible object indicating a particular subject and causes an overlay image, yielded by overlaying the name of the tangible object on the captured image, to be displayed on the display. In the example in FIG. 11, the names D14 (building A and building B) of the buildings at positions Pa and Pb, where the result of the shape comparison was a match, are displayed. As illustrated in FIG. 11, the name D14 may be overlaid on the area near a particular subject. The controller 6 need not overlay the name of a subject on the captured image when no shapes match. This embodiment allows the user to easily identify the name of a particular subject displayed in the captured image. The above embodiments also allow the electronic device 1 to identify the name of a subject to a high degree of accuracy with a smaller processing load. Furthermore, the names of particular subjects are appropriately selected for display in the above embodiments, further improving the convenience when overlaying names of subjects on a captured image.

Figure 14:
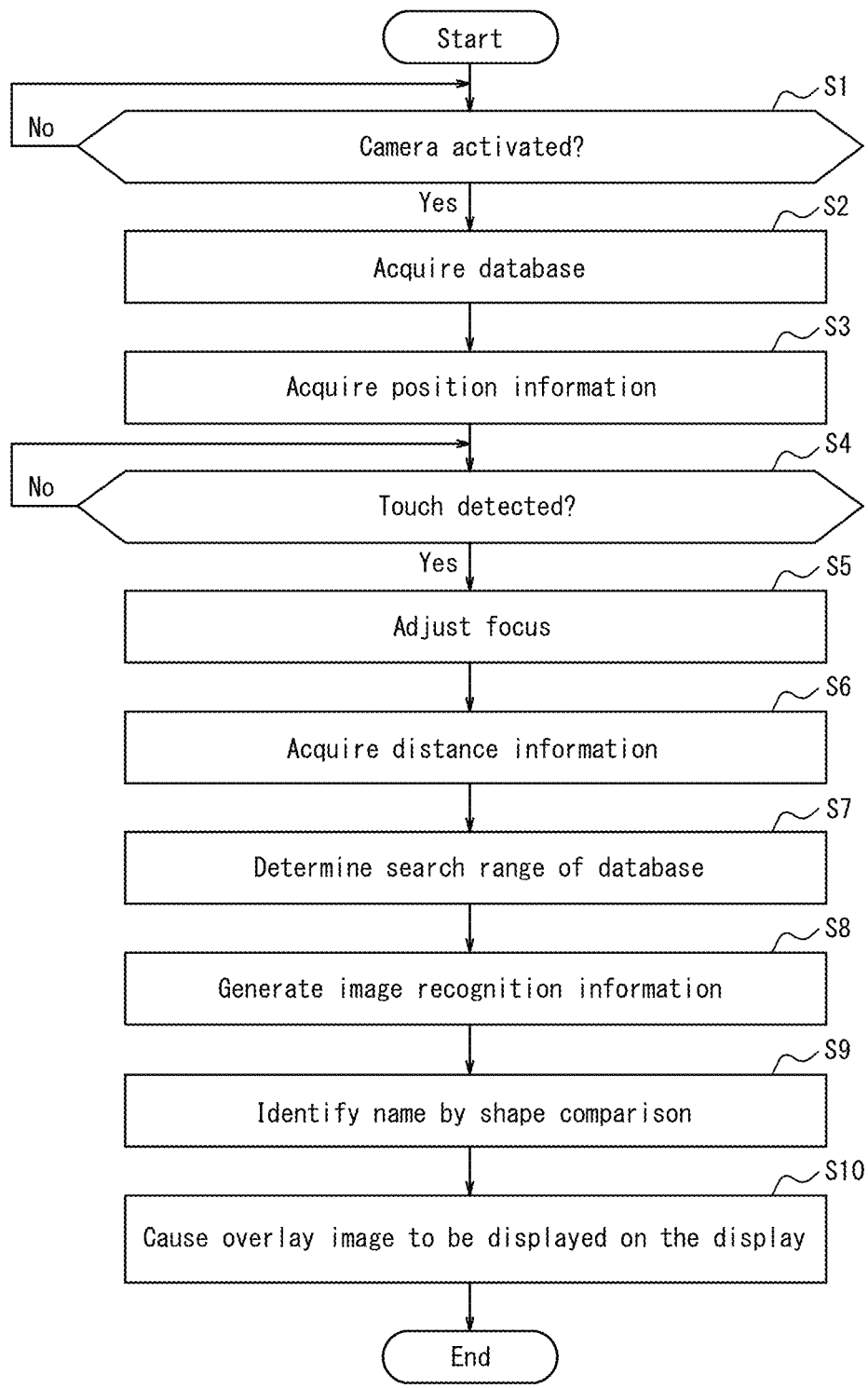
FIG. 14 is a flowchart illustrating processing for controlling the electronic device (control method)

FIG. 14 is a flowchart illustrating an example method for controlling the electronic device 1 of the present embodiment when displaying an overlay image on which the name of a particular subject is overlaid.

The controller 6 stands by while the imaging unit 5 (camera) is not activated (step S1: No).

When the imaging unit 5 (camera) is activated (step S1: Yes), the controller 6 acquires the database 11 (step S2).

The controller 6 acquires the position information of the electronic device 1 from the position sensor 7B (step S3).

The controller 6 stands by while a touch by the user indicating a particular subject is not detected (step S4: No).

When a touch is detected (step S4: Yes), the controller 6 executes processing for focus adjustment, i.e. focus processing (step S5).

As described above, the controller 6 acquires distance information indicating the distance from the electronic device 1 to a particular subject included in the captured image (step S6).

The controller 6 determines the search range of the database 11 (step S7). In other words, by determining the first range R0, the controller 6 limits the search target of the database 11 to tangible objects included in the first range R0.

The controller 6 generates image recognition information including second feature point information related to feature points of particular subjects (step S8).

As described above, the controller 6 identifies the names of particular subjects by shape comparison (step S9).

As illustrated in FIG. 11, for example, the controller 6 causes an overlay image including names D14 to be displayed on the display (step S10).

As described above, the sensor information 8C is, for example, position information, travel path information, speed information, distance information, direction information, gravitational acceleration information, barometric pressure information, height information, temperature information, size information, names, and the like. The convenience of the electronic device 1 further improves by two or more types of sensor information being overlaid on the captured image. In the example described below, the electronic device 1 overlays the name of a particular subject and size information in combination with other sensor information on the captured image.

Figure 15:
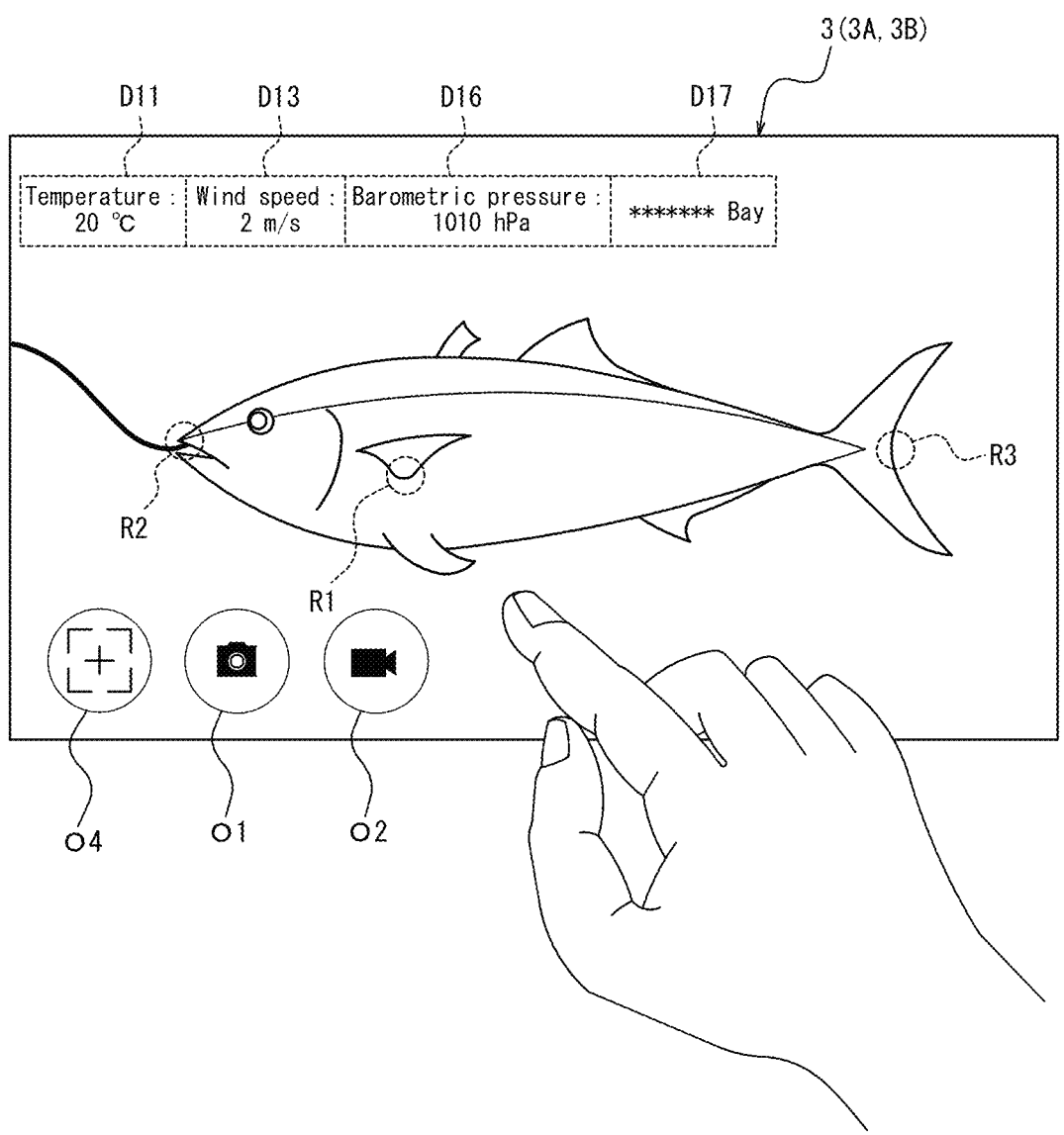
FIG. 15 illustrates an example of an overlay image displayed on the display unit while settings are being made.

FIG. 15 illustrates an example of an overlay image displayed on the display unit 3A while settings are being made. In the example in FIG. 15, the user is fishing. FIG. 15 illustrates an overlay image yielded by overlaying information on an image, captured by the imaging unit 5, of a fish the user caught. Size information, however, has not yet been overlaid in FIG. 15. The overlay image in FIG. 15 includes temperature information D11, wind speed information D13, barometric pressure information D16, and position information D17. The position information D17 indicates the current position of the electronic device 1, i.e. the position where the user is fishing. The wind speed information D13 indicates the current wind speed, acquired by the communication interface 4, at the position indicated by the position information D17. The barometric pressure information D16 indicates the current barometric pressure, detected by the barometric pressure sensor 7E, at the position indicated by the position information D17.

Objects for user operation are also displayed in the overlay image of FIG. 15. The still image storage object O1, the moving image storage object O2, and a focus object O4 are displayed in the example in FIG. 15. As described above, the still image storage object O1 and the moving image storage object O2 are objects for causing images to be stored in the storage 8. In other words, the overlay image is stored as a still image in the storage 8 when the user touches the still image storage object O1 (an example of a first operation). The overlay image is stored in the storage 8 as a moving image when the user touches the moving image storage object O2. As described above, the end object O3 is displayed instead of the moving image storage object O2, and storage of the moving image ends when the end object O3 is touched.

The focus object O4 is an object for starting focus processing. In other words, when the user touches the focus object O4 and subsequently touches a location, the controller 6 focuses on the object at the location (a fish in the example in FIG. 15) as a particular subject. For example, the user touches a point R1 that is a portion of a particular subject in the captured image. The controller 6 acquires distance information indicating the distance to the particular subject by using a well-known focus adjustment function provided in the imaging unit 5. This function may, for example, use an infrared laser. The user then designates the ends of a portion whose size the user wishes to measure (an example of a third operation). In the example in FIG. 15, the user touches point R2 (the head of the fish in the example in FIG. 15) and point R3 (the tail of the fish in the example in FIG. 15) of the particular subject in the captured image. The controller 6 starts size information detection processing by using a method similar to triangulation, for example, to calculate the actual length between points R2 and R3. For example, the controller 6 can acquire information of the angle of view of images captured by the imaging unit 5. The controller 6 can also acquire the coordinates on the touch-screen display 3 of points R2 and R3 from the input interface 3B. The controller 6 can use these pieces of information to calculate the angle between i) the shooting position and one end of the particular subject (corresponding to point R2, for example) and ii) the shooting position and the other end (corresponding to point R3, for example). The controller 6 can then calculate the actual length using the distance information to the particular subject acquired during focus adjustment. The length calculated in this way is size information.

Figure 16:
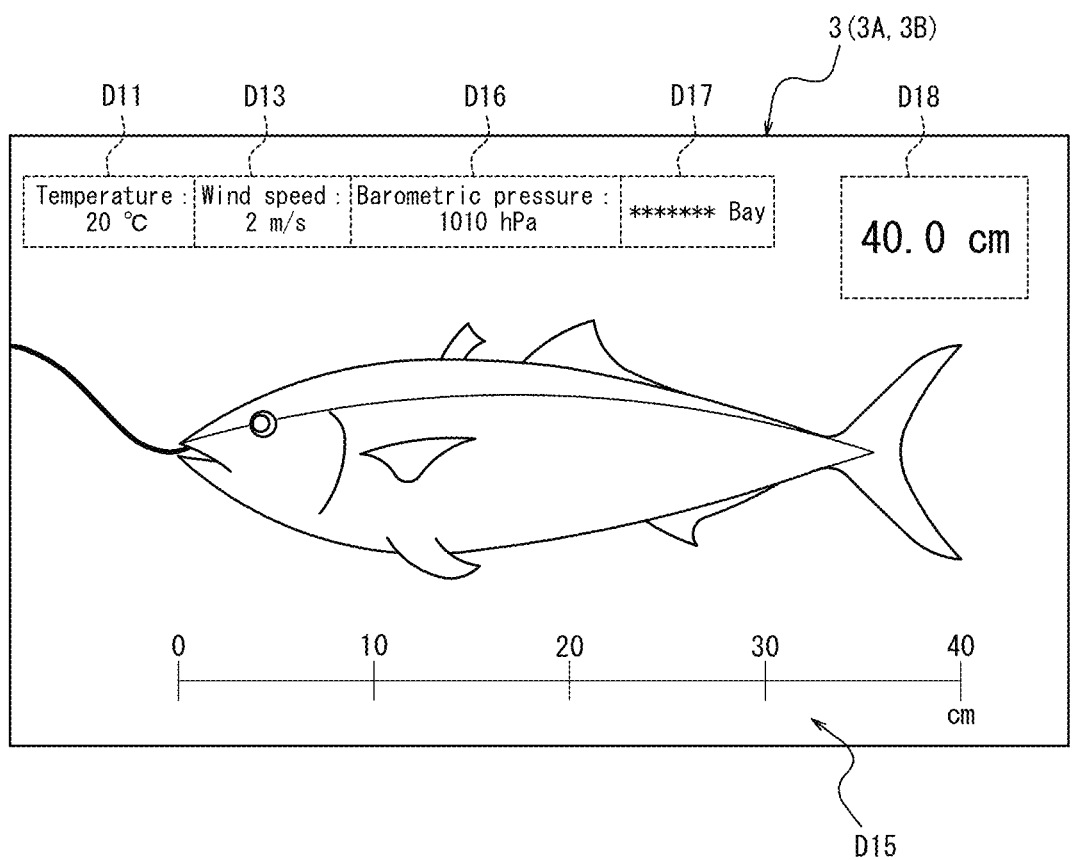
FIG. 16 illustrates yet another example of an overlay image displayed on the display unit.

FIG. 16 illustrates an example of an overlay image displayed on the display unit 3A after FIG. 15. As described above, the controller 6 overlays the size information on the captured image when the user performs an operation designating the ends of a portion whose size the user wishes to measure (an example of an operation to prescribe a measurement range within a captured image that includes a certain imaging range). The controller 6 displays, on the display unit 3A, an overlay image yielded by overlaying an object indicating the size information on the captured image that includes the particular subject. In the example in FIG. 16, the object is a gauge D15. The gauge D15 includes an image of a line segment having a predetermined width. The gauge D15 includes numbers and units (cm) to indicate the length. The controller 6 may further display size information on the overlay image in a different form than the object. In the example in FIG. 16, the overlay image includes a measurement result display D18, which is size information.

On the basis of an image captured by the imaging unit 5, the controller 6 thus measures size information related to a particular subject included in the captured image and displays, on the display unit 3A, an overlay image yielded by overlaying both the size information (such as the gauge D15) and sensor information 8C based on the detection result of the sensors 7 (such as the position information D17) on the captured image. On the basis of an image captured by the imaging unit 5, the controller 6 also measures size information related to a particular subject included in the captured image and displays, on the display unit 3A, an overlay image yielded by overlaying both the size information (such as the gauge D15) and information acquired by the communication interface 4 (such as the temperature information D11, wind speed information D13, and barometric pressure information D16) on the captured image. As described above, the information acquired by the communication interface 4 may be treated as sensor information 8C. In the example in FIG. 16, the controller 6 measures size information related to all of the particular subject and displays, on the display unit 3A, an overlay image yielded by overlaying an object indicating the size information on the captured image that includes the particular subject in its entirety. The controller 6 can measure the size information of at least a portion of the particular subject. The user may designate a portion instead of the entire particular subject when designating the ends of the portion whose size the user wishes to measure.

The controller 6 may cause the overlay image to be displayed on the display unit 3A on the basis of operation of the imaging unit 5. For example, when the user performs an operation to activate the camera (such as touching a camera icon on the main menu, which is an example of the second operation), the controller 6 may display the overlay image on the display unit 3A. As described above, after displaying the overlay image on the display unit 3A, the controller 6 stores the overlay image in the storage 8 as a still image when the user touches the still image storage object O1.

The controller 6 may overlay the sensor information 8C (such as the position information D17) on the captured image for only a predetermined time when the user performs an operation to activate the camera. The controller 6 may overlay an image related to size information (such as an image of the line segment having a predetermined width in the gauge D15) on the captured image for only a predetermined time when the user performs an operation to activate the camera. Display of the image related to the size information allows the user to recognize that size information can be measured.

As described above, after the user performs an operation to designate the ends of the portion whose size the user wishes to measure, the controller 6 may store the overlay image with the size information overlaid thereon in the storage 8 as a still image when the user touches the still image storage object O1. In other words, the controller 6 need not overlay the size information on the captured image when the user performs the operation to designate the ends of the portion whose size the user wishes to measure. Rather, the controller 6 may overlay the size information on the captured image when storing the overlay image in the storage 8 as a still image in response to the user touching the still image storage object O1.

The particular subjects in the above embodiment may include a plurality of subjects of the same type with individual differences in size. The particular subject may be a man-made object or a natural object. The particular subject may be a living organism or an inanimate object. Examples of particular subjects that are inanimate objects include buildings and furniture. Examples of particular subjects that are living organisms are not limited to fish but also include plants and animals.

The above embodiment allows the user to easily identify the size of a particular subject displayed in the captured image. The above embodiment also allows the user to learn what sized organisms can be caught or found in a certain environment. Furthermore, the above embodiments allow the user to confirm or recall what sized organisms were caught or found in a certain environment after capturing images. The size of a subject may have a causal relationship with the surrounding environment. For example, it might be easy to catch large fish at a particular location among a large, unspecified number of locations. Furthermore, the temperature, wind speed, and barometric pressure change depending on the time of day and season, but it may be easy to catch large fish at a particular temperature, wind speed, or barometric pressure. The user can, for example, record and learn what sized organism is likely to inhabit a certain environment. When the user captures an image of a fish he caught, it may therefore be useful to display the size, name, or the like of the caught fish on the captured image. The above embodiments also improve operability of the electronic device 1 by overlaying size information related to the particular subject.

Figure 17:
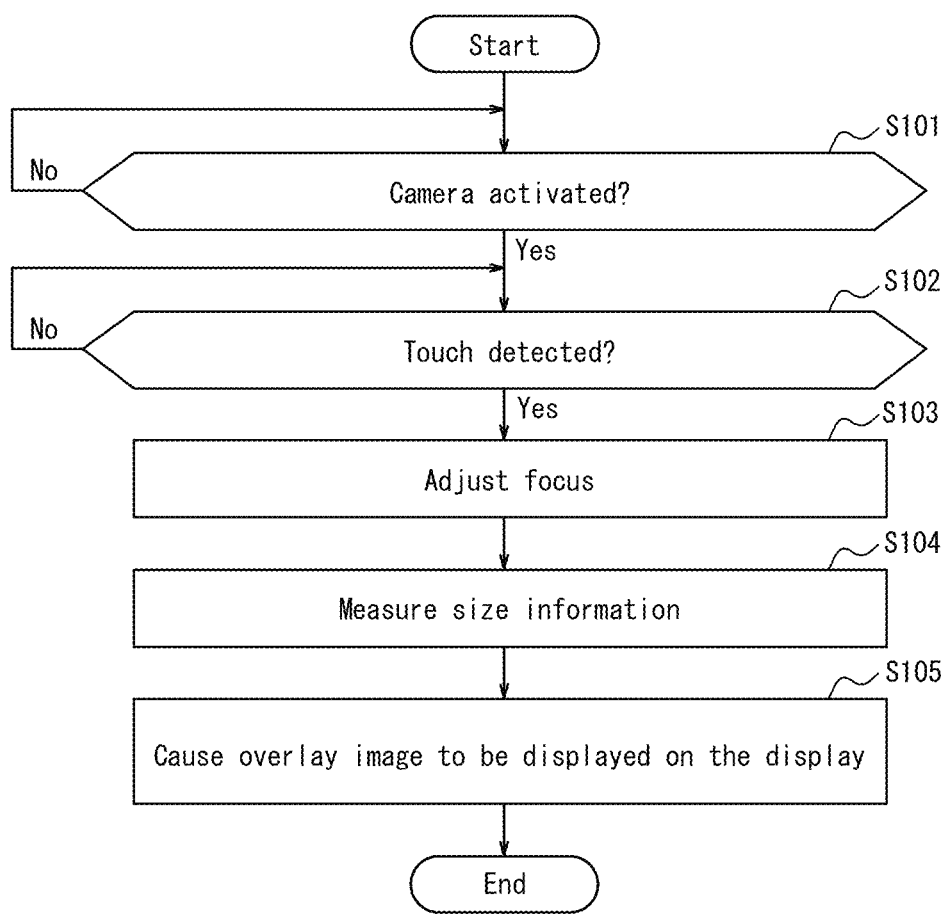
FIG. 17 is a flowchart illustrating processing for controlling the electronic device (control method)

FIG. 17 is a flowchart illustrating an example method for controlling the electronic device 1 of the present embodiment when displaying an overlay image on which the size information of a particular subject is overlaid.

The controller 6 stands by while the imaging unit 5 (camera) is not activated (step S101: No).

When the imaging unit 5 (camera) is activated (step S101: Yes), the controller 6 proceeds to step S102.

The controller 6 stands by while a touch by the user indicating a particular subject is not detected (step S102: No).

When a touch is detected (step S102: Yes), the controller 6 executes processing for focus adjustment, i.e. focus processing (step S103). In the above example, the controller 6 detects a touch by acquiring information indicating that the user touched the focus object O4 from the input interface 3B.

As described above, the controller 6 measures the size information of at least a portion of the particular subject (step S104).

As in FIG. 16, for example, the controller 6 causes an overlay image including the gauge D15 and the measurement result display D18 to be displayed on the display (step S105).

Figure 18:
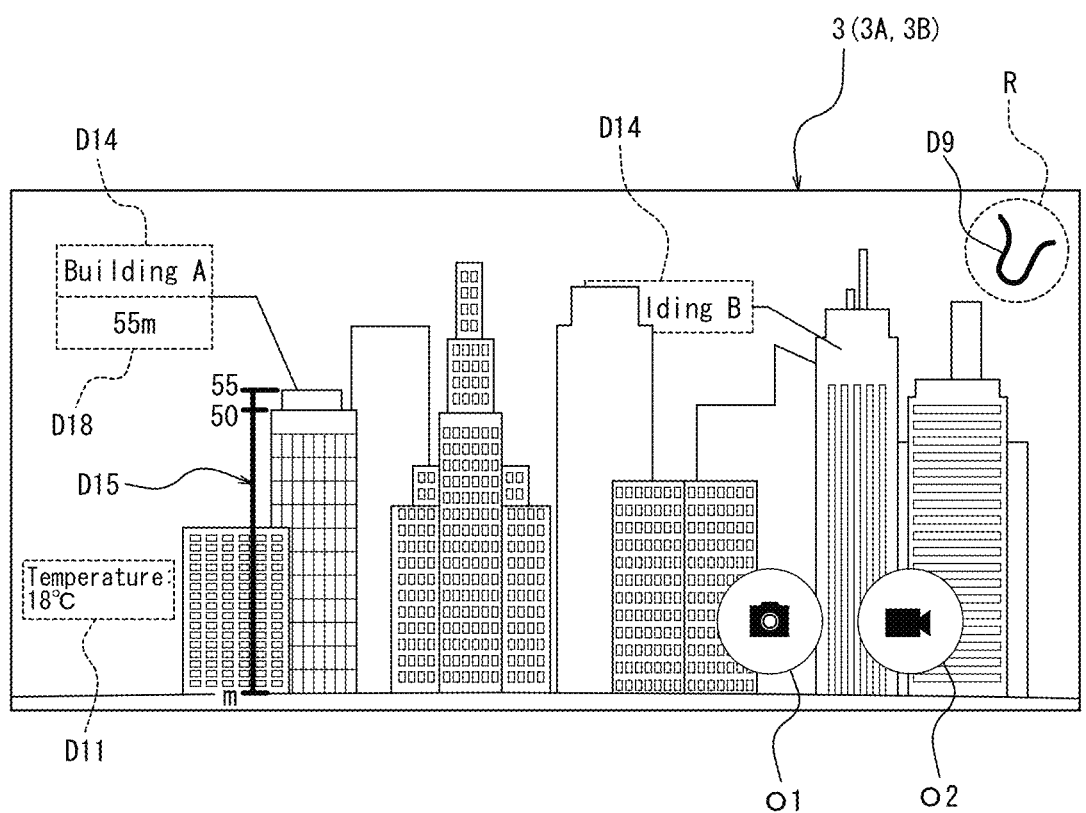
FIG. 18 illustrates yet another example of an overlay image displayed on the display unit.

The controller 6 can include the name of the particular subject and the size information in the overlay image. FIG. 18 illustrates an example of an overlay image displayed on the display unit 3A. In the example in FIG. 18, the user is walking. As compared to FIG. 11, the overlay image in FIG. 18 further includes the gauge D15 and the measurement result display D18. With the same method as above, the user designates the bottom and top of building A and causes the controller 6 to measure the length (i.e. the height of building A). In the example in FIG. 18, the height of building A is 55 m. On the basis of an image captured by the camera, the controller 6 thus measures size information related to at least a portion of a particular subject (building A) included in the captured image and displays an overlay image yielded by overlaying both the size information and name information on the captured image. The name D14 is specified on the basis of the tangible object name information 110 acquired by the communication interface 4. In other words, on the basis of an image captured by the camera, the controller 6 measures size information related to at least a portion of a particular subject (building A) included in the captured image and displays an overlay image yielded by overlaying both the size information and information acquired by the communication interface 4 (name D14) on the captured image.

Figure 19:
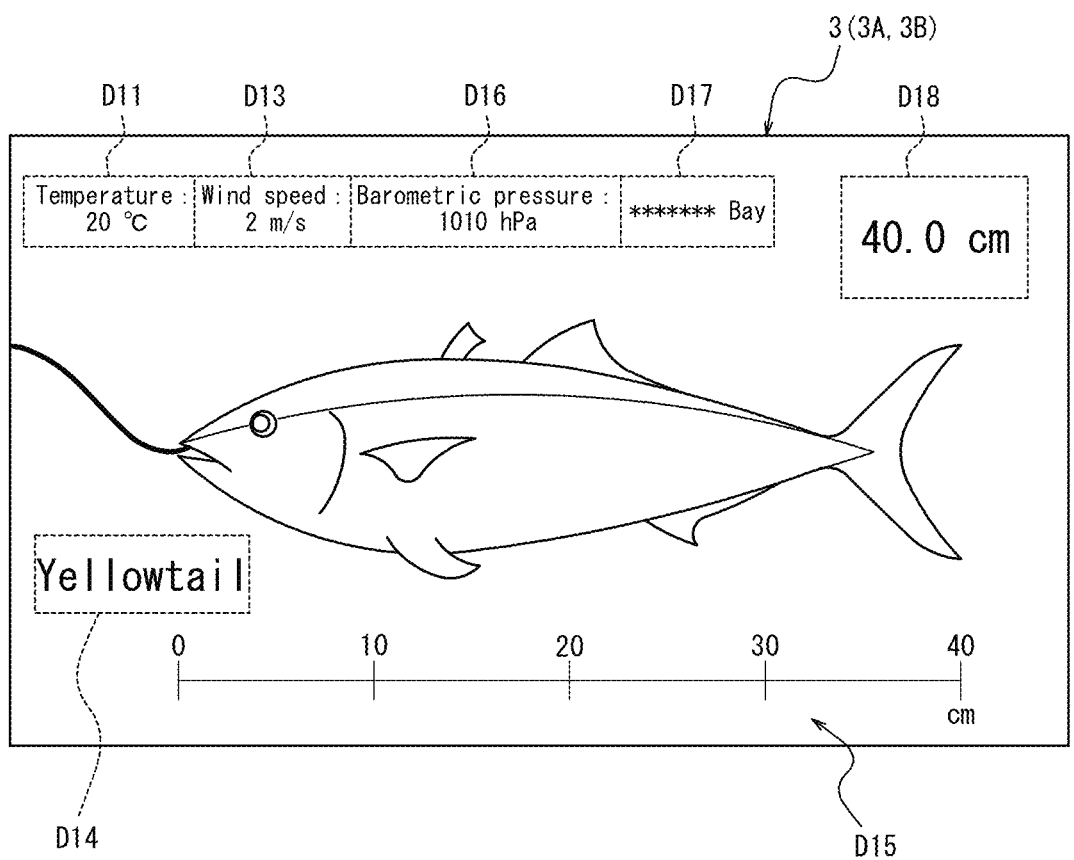
FIG. 19 illustrates yet another example of an overlay image displayed on the display unit.

FIG. 19 illustrates an example of an overlay image displayed on the display unit 3A. In the example in FIG. 19, the user is fishing. As compared to FIG. 16, the overlay image in FIG. 19 further includes a name D14. In the example in FIG. 19, the name D14 is "yellowtail", the type of fish that the user caught. In other words, the controller 6 includes, in the overlay image, at least one of information common to tangible objects including the particular subject (name D14) and the size information unique to the particular subject (gauge D15 and measurement result display D18). The controller 6 identifies the information shared by the particular subject in the following way, for example. First, the controller 6 acquires the position information of the electronic device 1 from the position sensor 7B. The controller 6 judges that the particular subject is a fish using well-known image processing or the like. The controller 6 selects a candidate type of fish depending on whether the ocean near the position information of the electronic device 1 is included in the habitat indicated as the first position information 111. The controller 6 then identifies the name by a shape comparison between the first feature point information 112 of the candidate fish and the fish included in the captured image. As illustrated in FIG. 19, both name information of the particular subject included in the captured image and sensor information (information acquired by the communication interface 4) may be overlaid on the captured image.

In the above embodiments, both name information and size information, or both name information and sensor information (information acquired by the communication interface 4) are overlaid on the captured image and stored. After storage, the user can therefore newly confirm or recall not only the name but also other information necessary for the user along with the captured image. For example, the user can collectively record required information, such as images of structures, names, and dates, at a construction site or the like and confirm the information later.

Figure 20:
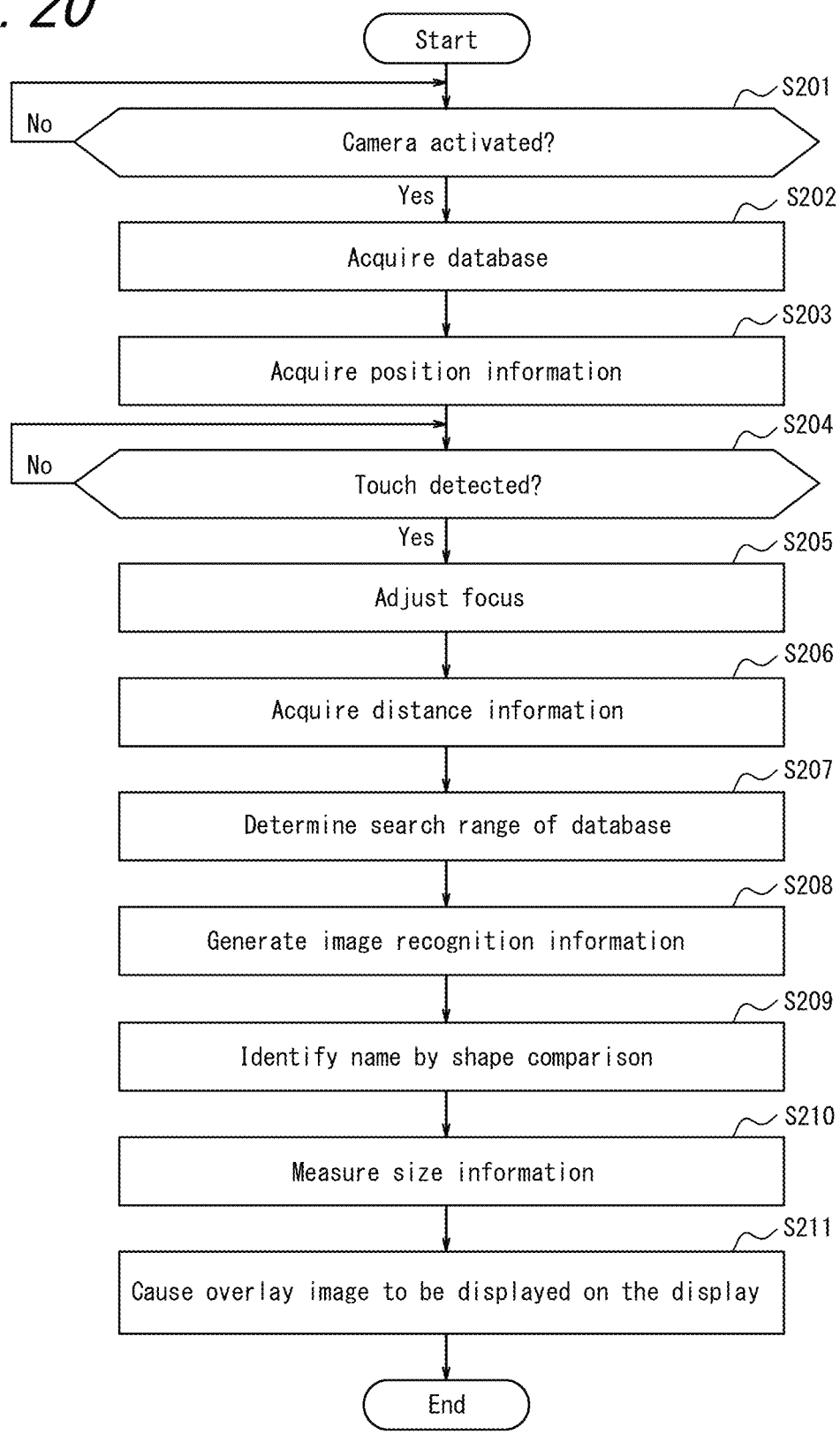
FIG. 20 is a flowchart illustrating processing for controlling the electronic device (control method)

FIG. 20 is a flowchart illustrating an example method for controlling the electronic device 1 of the present embodiment when displaying an overlay image on which the name and size information of a particular subject are overlaid.

The controller 6 stands by while the imaging unit 5 (camera) is not activated (step S201: No).

When the imaging unit 5 (camera) is activated (step S201: Yes), the controller 6 acquires the database 11 (step S202).

The controller 6 acquires the position information of the electronic device 1 from the position sensor 7B (step S203).

The controller 6 stands by while a touch by the user indicating a particular subject is not detected (step S204: No).

When a touch is detected (step S204: Yes), the controller 6 executes processing for focus adjustment, i.e. focus processing (step S205).

As described above, the controller 6 acquires distance information indicating the distance from the electronic device 1 to a particular subject included in the captured image (step S206).

The controller 6 determines the search range of the database 11 (step S207). In other words, the controller 6 limits the search target of the database 11 on the basis of the position information of the electronic device 1 or the like.

The controller 6 generates image recognition information including second feature point information related to feature points of the particular subject (step S208).

As described above, the controller 6 identifies the name of the particular subject by shape comparison (step S209).

As described above, the controller 6 measures the size information of at least a portion of the particular subject (step S210).

As in FIG. 18 or FIG. 19, for example, the controller 6 causes an overlay image including the names D14, gauge D15, and/or measurement result display D18 to be displayed (step S211).

In this way, the electronic device 1 according to the present embodiment can cause overlay images such as those described above to be displayed on the display, improving convenience of information display.

Figure 21:
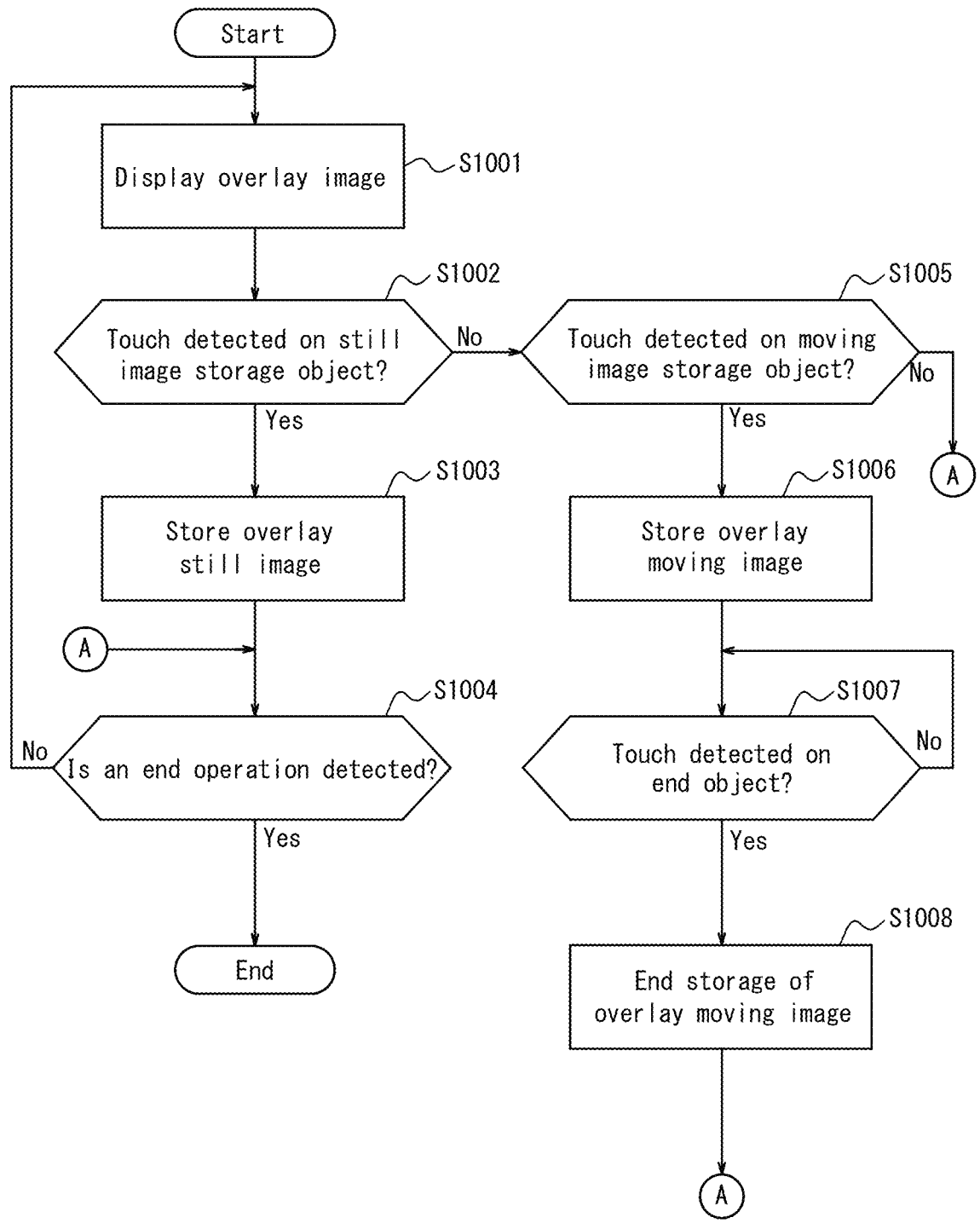
FIG. 21 is a flowchart illustrating processing after an overlay image is displayed.

Next, an example of processing after display of the overlay image is described with reference to the flowchart in FIG. 21.

The electronic device 1 displays the overlay image on the display (step S1001).

When a touch on the still image storage object O1 is detected (step S1002: Yes), the electronic device 1 stores an overlay still image (step S1003).

When a touch on the still image storage object O1 is not detected (step S1002: No), the electronic device 1 proceeds to step S1005.

When a touch on the moving image storage object O2 is detected (step S1005: Yes), the electronic device 1 starts to store an overlay moving image (step S1006).

When a touch on the moving image storage object O2 is not detected (step S1005: No), the electronic device 1 proceeds to step S1004.

From the start of storage of the overlay moving image, the electronic device 1 stands by while recording the overlay moving image as long as a touch on the end object O3 is not detected (step S1007: No).

When a touch on the end object O3 is detected (step S1007: Yes), the electronic device 1 ends storage of the overlay moving image (S1008) and proceeds to step S1004.

The electronic device 1 ends the processing sequence when a touch on the moving image storage object O2 is not detected after storage of the overlay still image, or when an end operation is detected after storage of the overlay image is complete (step S1004: Yes).

When an end operation is not detected (step S1004: No), the electronic device 1 returns to step S1001.

Although the subject matter of the present disclosure has been described with reference to the drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

For example, the user can make various settings regarding the display of the name D14 on the overlay image. The user may, for example, specify that the name D14 not be overlaid on a designated tangible object in the captured image. When the user designates a particular building, for example, a portion of the name D14 "building B" that was displayed in the foreground may be removed from the foreground, as in FIG. 18.

The name D14 may be overlaid only on tangible objects designated by the user. In other words, when a predetermined operation including an operation to select one or more particular subjects is performed after the controller 6 causes the captured image to be displayed on the display unit 3A, the controller 6 may cause an overlay image, yielded by overlaying the name D14 of each selected particular subject on the captured image, to be displayed on the display unit 3A. At this time, the user can control which names D14 are displayed on the overlay image and can thus prevent the overlay image from becoming difficult to see because of too many names D14. The controller 6 may provide notification when no match occurs during shape comparison. For example, when no match occurs during shape comparison, the controller 6 causes an overlay image, yielded by overlaying text or an object indicating the lack of matching on the captured image, to be displayed on the display. The object indicating the lack of matching during shape comparison may be hidden after being overlaid on the captured image for a predetermined time. The text indicating the lack of matching during shape comparison may, for example, be "unknown name". The object indicating the lack of matching during shape comparison may, for example, be a question mark. This configuration allows the user to identify whether a name was not overlaid on the captured image because overlay processing was not executed or because overlay processing was executed but was unable to identify the name of the subject.

As another example, the name D14 may be overlaid with the following method only on tangible objects designated by the user. When the names of a plurality of particular subjects included in the captured image are identified, as in the example in FIG. 11, the controller 6 causes a first overlay image, yielded by overlaying the plurality of particular subjects on the captured image, to be displayed on the display. When the user performs a predetermined operation including an operation to select one or more particular subjects after the first overlay image is displayed, the controller 6 causes a second overlay image, yielded by hiding the name of the selected one or more particular subjects, to be displayed on the display. In this example, information on each particular subject selected by the predetermined operation is detected by the input interface 3B and output to the controller 6. The controller 6 then hides the name of each selected particular subject.

After the user touches the focus object O4 and the point R1 in the example in FIG. 15, the focus object O4 may be removed from the overlay image, and the user may be notified that the mode has changed. In other words, when a predetermined operation (such as touching the focus object O4) is performed while the captured image is being displayed, the controller 6 may switch between a first mode in which focus processing can be performed and a second mode in which size information detection processing can begin.

In the example in FIG. 12, tangible objects whose position is included in the first position information 111 (buildings A and B) are present in the first range R0. As described above, however, the probability of such tangible objects not being present in the first range increases when the controller 6 sets the first range R0 with no relation to the angle of view of the captured image as compared to when the controller 6 sets the first range R0 in accordance with the angle of view of the captured image. When no such tangible object is present in the first range R0, the controller 6 may perform the following processing. When no tangible object is present in the first range R0, the controller 6 identifies first position information 111 included in a second range that extends the distance indicated by the distance information from the position indicated by the second position information (the position P0 of the electronic device 1), without regard to direction. In other words, the controller 6 draws a circle centered on the position P0 of the electronic device 1 and identifies tangible objects included in the region enclosed by the circle (second range). A portion of the second range corresponds to the first range R0. The controller 6 identifies a tangible object indicating a particular subject by identifying which of the pieces of first feature point information 112 of the tangible objects included in the second range matches the second feature point information. The controller 6 then causes an overlay image, yielded by overlaying the name of the tangible object indicating the particular subject on the captured image, to be displayed on the display. The controller 6 may execute this processing not only when no tangible object whatsoever is present in the first range R0, but also when no first feature point information 112 matches the second feature point information during the shape comparison processing (when at least one name is unknown during the shape comparison processing).

When requesting that the user perform a new operation, the controller 6 in the above embodiments may include a guide in the overlay image to prompt the user. For example, after the user touches the focus object O4 in the example in FIG. 15, the controller 6 may display "Tap a position to focus on" to prompt the user to tap a particular subject. After the user then touches the fish, which is a particular subject, in the example in FIG. 15, the controller 6 may display "Tap the ends of the fish" to encourage the user to designate the length to measure. The convenience of the electronic device 1 is further improved by such a display prompting the user for the next operation.

In another embodiment, the controller 6 may generate the overlay image and then store the overlay image in the storage 8 without displaying the overlay image on the display unit 3A. In other words, the controller 6 may generate the overlay image and then store the overlay image in the storage 8 while displaying a captured image on which overlay processing has not been performed on the display unit 3A.

The functions provided in the electronic device 1 may be implemented by a plurality of apparatuses. For example, the functions provided in the electronic device 1 may be implemented by a first apparatus that includes at least the imaging unit 5 and a second apparatus that includes at least the display unit 3A. The first apparatus and the second apparatus are connected in a wired or wireless manner. The first apparatus transmits at least an image captured by the imaging unit 5 to the second apparatus in a wired or wireless manner. Either the first apparatus or the second apparatus may perform the overlay processing on the captured image. When the first apparatus performs the overlay processing, the first apparatus transmits the overlay image to the second apparatus in a wired or wireless manner. The second apparatus displays the received overlay image on the display unit 3A. When the second apparatus performs the overlay processing, the first apparatus transmits a captured image, on which overlay processing has not been performed, and the sensor information 8C to the second apparatus in a wired or wireless manner. The second apparatus performs the overlay processing on the received captured image and displays the overlay image on the display unit 3A. The first and second apparatuses may, for example, be an action camera and a smartphone, or an action camera and a wearable device, but these examples are not limiting.

The invention claimed is:

1. An electronic device, comprising:
   a camera configured to capture an image including a particular subject;
   a sensor configured to perform continuous detection of a state related to the electronic device;
   a display; and
   a controller;
   wherein
   the controller is configured to
      acquire distance information indicating a distance from the electronic device to the particular subject,
      determine, using the acquired distance information and a position of the electronic device, a search range of a database,
      identify a name of the particular subject by using information included in the determined search range of the database,
      determine, on the basis of the captured image captured by the camera and the acquired distance information, size information related to at least a portion of the particular subject included in the captured image, and
      cause an overlay image, yielded by overlaying the name, the size information and sensor information based on a detection result of the continuous detection by the sensor on the captured image, to be displayed on the display, the sensor information including at least one of temperature information, speed information, or barometric pressure information and indicating changes in the state related to the electronic device.

2. The electronic device of claim 1, wherein the controller is configured to include, in the overlay image, at least one of information common to tangible objects including the particular subject and the size information unique to the particular subject.

3. The electronic device of claim 1, further comprising:
a storage configured to store the database and the overlay image, wherein
the controller is configured to cause the overlay image stored in the storage to be displayed on the display.

4. The electronic device of claim 3, wherein the controller is configured to store the overlay image in the storage in response to a first operation being performed after the controller causes the overlay image to be displayed on the display.

5. The electronic device of claim 4, wherein the controller is configured to
cause the overlay image to be displayed on the display in response to a second operation being performed, and
cause the overlay image to be stored in the storage in response to the first operation being performed after the overlay image is displayed on the display.

6. The electronic device of claim 5, wherein the controller is configured to overlay the sensor information on the captured image for only a predetermined length of time in response to the second operation being performed.

7. The electronic device of claim 5, wherein the controller is configured to overlay an image related to the size information on the captured image for only a predetermined length of time in response to the second operation being performed.

8. The electronic device of claim 7, wherein the controller is configured to overlay the size information on the captured image in response to a third operation being performed.

9. The electronic device of claim 8, wherein the captured image includes a certain imaging range, and the controller is configured to overlay the size information on the captured image in response to, as the third operation, an operation being performed to prescribe a measurement range within the captured image.

10. The electronic device of claim 8, wherein the controller is configured to cause the overlay image to be stored in the storage in response to the first operation being performed after the size information is overlaid on the captured image.

11. The electronic device of claim 1, further comprising:
a touch sensor configured to start focus processing and size information detection processing, wherein
the controller is configured to switch, in response to a predetermined operation being performed while the captured image is being displayed, between a first mode in which focus processing can be performed and a second mode in which size information detection processing can start.

12. The electronic device of claim 1, wherein the controller is configured to overlay an object indicating the size information on the captured image that includes the particular subject, to obtain the overlay image to be displayed on the display.

13. The electronic device of claim 12, wherein the object includes a line segment having a predetermined width.

14. The electronic device of claim 12, wherein the size information is further displayed on the overlay image in a different form than the object.

15. The electronic device of claim 1, wherein the controller is configured to
determine the size information related to an entirety of the particular subject, and
overlay an object indicating the size information related to the entirety of the particular subject on the captured image including the particular subject, to obtain the overlay image to be displayed on the display.

16. The electronic device of claim 1, wherein the controller is configured to identify a name of another particular subject included in the determined search range of the database, and cause the display to display the name of said another particular subject on the overlay image.

17. A method of controlling an electronic device comprising a camera, a sensor, a display, and a controller, the method comprising:
capturing, by the camera, an image including a particular subject;
performing, by the sensor, continuous detection of a state related to the electronic device;
acquiring, by the controller, distance information indicating a distance from the electronic device to the particular subject;
determining, using the acquired distance information and a position of the electronic device, a search range of a database;
identify a name of the particular subject by using information included in the determined search range of the database;
determining, by the controller, size information on the basis of the captured image captured by the camera and the acquired distance information, the size information being related to at least a portion of the particular subject included in the captured image; and
causing, by the controller, an overlay image to be displayed on the display, the overlay image being yielded by overlaying the name, the size information and sensor information based on a detection result of the continuous detection by the sensor on the captured image, the sensor information including at least one of temperature information, speed information, or barometric pressure information and indicating changes in the state related to the electronic device.

18. A non-transitory computer-readable recording medium including computer program instructions to be executed by an electronic device comprising a camera, a sensor, a display, and a controller, the instructions, when executed, causing the electronic device to perform:
capturing, by the camera, an image including a particular subject;
performing, by the sensor, continuous detection of a state related to the electronic device;
acquiring, by the controller, distance information indicating a distance from the electronic device to the particular subject;
determining, using the acquired distance information and a position of the electronic device, a search range of a database;
identify a name of the particular subject by using information included in the determined search range of the database;
determining, by the controller, size information on the basis of the captured image captured by the camera and the acquired distance information, the size information being related to at least a portion of the particular subject included in the captured image; and causing, by the controller, an overlay image to be displayed on the display, the overlay image being yielded by overlaying the name, the size information and sensor information based on a detection result of the continuous detection by the sensor on the captured image, the sensor information including at least one of temperature information, speed information, or barometric pressure information and indicating changes in the state related to the electronic device.

19. An electronic device, comprising:
a camera configured to capture an image including a particular subject;
a sensor configured to perform continuous detection of a state related to the electronic device;
a communication interface;
a display; and
a controller;
wherein
the controller is configured to
acquire distance information indicating a distance from the electronic device to the particular subject,
determine, using the acquired distance information and a position of the electronic device, a search range of a database,
identify a name of the particular subject by using information included in the determined search range of the database,
determine, on the basis of the captured image captured by the camera and the acquired distance information, size information related to at least a portion of the particular subject included in the captured image; and
cause an overlay image, yielded by overlaying the name, the size information, and sensor information based on a detection result of the continuous detection by the sensor, and information acquired by the communication interface on the captured image, to be displayed on the display, the sensor information including at least one of temperature information, speed information, or barometric pressure information and indicating changes in the state related to the electronic device.

* * * * *